United States Patent [19]

Maeda et al.

[11] Patent Number: 5,649,022

[45] Date of Patent: Jul. 15, 1997

[54] PATTERN CHECKING METHOD AND CHECKING APPARATUS

[75] Inventors: Shunji Maeda, Yokohama; Hitoshi Kubota, Fujisawa; Hiroshi Makihira; Takashi Hiroi, both of Yokohama, all of Japan

[73] Assignee: Hitachi, Ltd., Tokyo, Japan

[21] Appl. No.: 888,494

[22] Filed: May 27, 1992

[30] Foreign Application Priority Data

May 27, 1991 [JP] Japan .................................. 3-120913
Jun. 27, 1991 [JP] Japan .................................. 3-181540

[51] Int. Cl.$^6$ .................................................... G06K 9/00
[52] U.S. Cl. ........................................................ 382/141
[58] Field of Search ................................. 382/141, 293, 382/295, 296

[56] References Cited

U.S. PATENT DOCUMENTS

| | | | |
|---|---|---|---|
| 3,869,697 | 3/1975 | Kawasaki et al. | 382/45 |
| 4,136,332 | 1/1979 | Kadota et al. | 382/45 |
| 4,334,241 | 6/1982 | Kashioka et al. | 382/45 |
| 4,614,430 | 9/1986 | Hara et al. | 382/8 |
| 4,651,341 | 3/1987 | Nakashima et al. | 382/8 |
| 4,672,676 | 6/1987 | Linger | 382/45 |
| 4,680,627 | 7/1987 | Sase et al. | 382/8 |
| 4,805,123 | 2/1989 | Specht et al. | 382/8 |
| 4,860,371 | 8/1989 | Matsuyama et al. | 382/8 |
| 4,885,784 | 12/1989 | Miyagawa et al. | 382/45 |
| 4,926,489 | 5/1990 | Danielson et al. | 382/8 |
| 5,068,912 | 11/1991 | Concannon et al. | 382/45 |

FOREIGN PATENT DOCUMENTS

| | | | |
|---|---|---|---|
| 63-128241 | 5/1988 | Japan | G01N 21/88 |
| 2-170279 | 7/1990 | Japan | G06F 15/62 |

*Primary Examiner*—Jose L. Couso
*Attorney, Agent, or Firm*—Antonelli, Terry, Stout & Kraus, LLP

[57] ABSTRACT

A pattern checking method wherein an image of a certain position of one pattern is detected; the detected image is positioned with respect to an image of a position corresponding to the certain position, in a reference pattern image; and the positioned images are compared with each other, whereby a discrepant place among these positioned images is judged as a defect the positioning operations of the images of the detected patterns are controlled based upon either pattern information such as density of the images of the detected patterns, or information obtained from the positioning operations for images of other positions in the patterns. An image sensor unit for detecting images of patterns is constructed which has such a structure that a plurality of one-dimensional image sensors functioning as a pattern detector are arranged in a two-dimensional form, and an output of a certain one-dimensional image sensor for imaging a certain position of one pattern is delayed for a predetermined time period, and also both of an output of an one-dimensional image sensor adjoining the first-mentioned one-dimensional image sensor, which images the same position of the same pattern, and the delayed output of the certain one-dimensional image sensor are sequentially added to derive a summation output. The image sensor unit is inclined at a predetermined angle with respect to a plane perpendicular to the reflection light from the patterns, and the reflection light from the patterns is focused via a confocal focusing optical system onto this image sensor unit.

43 Claims, 12 Drawing Sheets

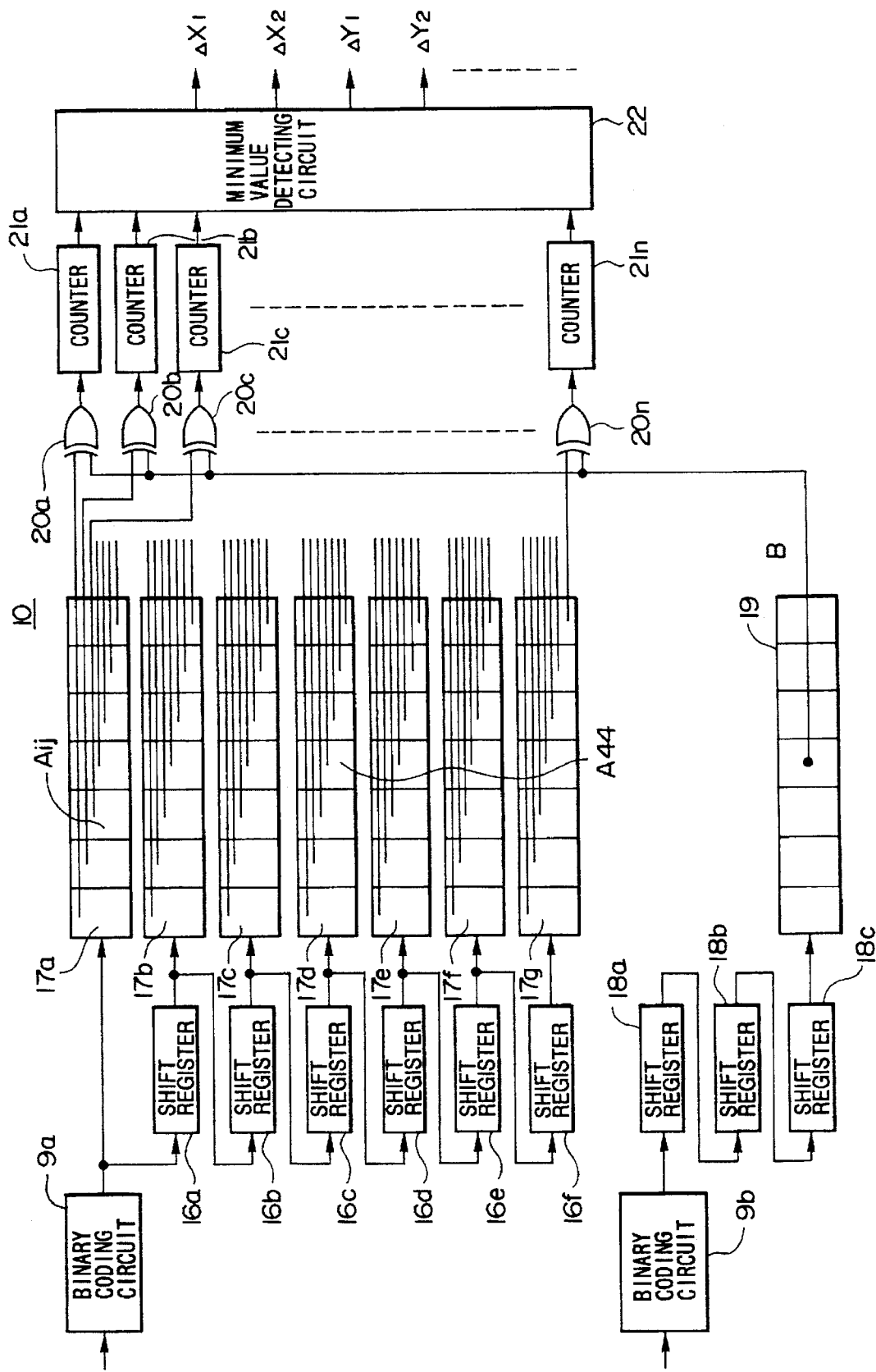

PATTERN CHECKING METHOD AND CHECKING APPARATUS

CROSS-REFERENCE OF RELEVANT PATENT APPLICATION

The present application relates to U.S. patent application Ser. No. 07/641,001 entitled "Method and Apparatus for Detecting Pattern" filed on Jan. 14, 1991 in the name of Maeda et al now U.S. Pat. No. 5,153,444.

BACKGROUND OF THE INVENTION

The present invention generally relates to a pattern checking method and a pattern checking apparatus for checking an image of a pattern to be checked (a checking pattern) and also a method and an apparatus for checking a defect of a checking pattern by utilizing the checking method/apparatus. More specifically, the present invention is directed to a pattern checking method and a pattern checking apparatus suitable for checking an outer appearance of a pattern such as a semiconductor wafer and a liquid crystal display.

Conventionally, this sort of checking apparatus is known in the art, for instance, as described in the Japanese publication of JP-A-59-192943 (1984). In this publication, while a plurality of checking patterns which are successively arranged, are moved at a preset velocity, the images of these checking patterns are sequentially detected by means of imaging elements, e.g., a line sensor. The positional shift between the detected image signal and the image signal which has been delayed by a time period equal to a difference in the detecting times of two checking patterns, is corrected at predetermined time periods. After these image signals are made to be coincident with each other at high precision, these signals are compared, whereby a discrepant point between these image signals is recognized as a defect. This positional-shift correction is performed in such a manner that, for instance, the pattern edges of the respective checking patterns are detected to detect these positional shifts, and then the delay amount of the delayed image signal is controlled in response to this detected amount.

As the line sensor, very recently, either a one-dimensional CCD (charge-coupled-device) line sensor, or a TDI (time delay and integration) CCD image sensor has been used to detect an image of a pattern of interest with employment of an objective lens having a relatively large magnification. It should be noted that a TDI image sensor is such an image sensor having a structure that a plurality of one-dimensional image sensors are arranged in a two-dimensional form, and in which the output signals from the respective one-dimensional image sensors are delayed by preselected delay times, and the output signals from the one-dimensional image sensors which are positioned adjacent to each other and scan the same position of the object are added to each other, whereby the detecting light amount is increased.

However, there are problems with such a sensor structure being that the respective layers of the multi-layer as the object are overlapped with each other, thereby causing the multi-layer to have increasingly higher stepped portions and concave/convex portions. Also an objective lens having a great magnification has a short depth of focus and therefore only the patterns focused onto the image sensors in a narrow range may be detected as pattern images. Further other major portions of the patterns are blurred. As a result, only a portion of the pattern which can be focused is checked in accordance with the conventional checking method. There are other problems being that the defect detecting sensitivities with respect to the remaining major pattern portions which are out of focus become low, and thus a pattern checking operation with high reliability cannot be realized.

In accordance with the conventional checking methods and apparatuses, since the above-described positional shift corrections performed every predetermined time period are separately executed for the respective images, namely within a relatively narrow area, there are some risks that the pattern edges cannot be detected at the places whose pattern density is low, or positioned near a significant/large pattern defect. Also, since such a positional shift correction may be performed at a defective edge, correct positioning operations can not be performed non expected. As a consequence, an erroneous detection wherein a normal pattern part is mistakenly detected as a pattern defect may occur as a result of use of the above-described conventional techniques. Thus, a checking operation with high reliability cannot be realized using the above-described conventional technique.

Since it is difficult in practice to continuously move the checking patterns at a constant speed, there are problems that image distortions may be caused by speed variations, or vibrations of the detecting optical system. Therefore, since the positional shifts are produced due to many factors, the unit of the positional shift correction, namely the area of the image must be designed to a suitable value in order not to receive such adverse influences. However, it is difficult to optimize an aperiodic distortion, or a performance specific to the checking apparatus. Accordingly, no correct positioning operation can be performed, and erroneous detecting operation may occur wherein a normal pattern part may be is detected as a defect.

SUMMARY OF THE INVENTION

The present invention has an object to provide a pattern checking method and a pattern checking apparatus capable of eliminating the conventional drawbacks of the conventional techniques described above.

Another object of the present invention is to provide a pattern checking method and a pattern checking apparatus capable of checking an image of a checking pattern at high reliability.

To achieve such objects, according to one aspect of the present invention, a pattern checking method is provided wherein an image of a certain position of one pattern is detected. The detected image is positioned with respect to an image of a position corresponding to a certain position, in a reference pattern images and the positioned images are compared with each other. A discrepant place among these positioned images is judged as a defect. The positioning operations of the images of the detected patterns are controlled based upon either pattern information such as density of the images of the detected patterns, or information obtained from the positioning operations for images of other positions in the patterns.

According to another aspect of the present invention, an image checking method is provided that employs an image sensor unit having a construction such that a plurality of one-dimensional image sensors functioning as a pattern detector are arranged in a two-dimensional form, and an output of a certain one-dimensional image sensor for imaging a certain position of one pattern is delayed for a predetermined time period. Also both of an output of an one-dimensional image sensor adjoining the first-mentioned one-dimensional image sensor, which images the same position of the same pattern, and the delayed output of the certain one-dimensional image sensor are sequentially added to derive a summation output. The method includes the step of inclining the image sensor unit at a predetermined angle with respect to a plane perpendicular to light reflected from the patterns, and focusing the reflected light from the patterns via a confocal focusing optical system to the image sensor unit.

According to an example of the present invention, when two images formed having the same pattern are detected, positioned with each other, compared with each other, and then a discrepancy between them is judged as a defect, the positional shift amounts of these images are detected every predetermined time period so as to perform the positioning operation. If there are great differences between the current detected positional shift amount and the preceding detected positional shift amount and great differences between the number of discrepant pixels in these images detected during the current detecting operation and those detected during the preceding detecting operation. Alternatively if large shift amounts are required in focusing the images at a place whose pattern density is small, the above-explained positioning operations may be carried out at a large number of positioning points by employing not only the current detected positional shift amount, but also the preceding detected positional shift amount, and the reference positional shift amount. Otherwise, the defect detecting sensitivity is varied.

In accordance with the present invention, occurrences of positioning errors at a place with small pattern density, or a place where a large pattern defect is positioned close thereto, can be prevented, and thus the erroneous detection of the normally operable part can be reduced. Even if there is a positional shift caused by image distortions, the correct positioning operation can be achieved. Furthermore, even when the positioning operation is not correctly performed, no erroneous detection of a normally operable part is performed.

In accordance with one example of the present invention, the following techniques are proposed.

①An image sensor namely a "TDI image sensor" is employed and inclined at a predetermined angle with respect to a plane perpendicular to reflected light from a checking pattern and the reflected light is focused on the image sensor via a confocal focusing optical system. The TDI image sensor has a structure that a plurality of one-dimensional image sensors are arranged in a two-dimensional form, and also has such a function that the output signals from the respective one-dimensional image sensors are delayed by predetermined delay times and added to the output signal from the one-dimensional image sensor positioned adjacent the first-mentioned one-dimensional image sensor, which scans the same position of the object.

②The inclination direction of the TDI image sensor corresponds to a direction perpendicular to a longitudinal direction of the plural one-dimensional image sensors inside the image sensor under condition that a center of the image sensor is a fulcrum.

③The inclination angle is such an angle corresponding to a difference between a concave and a convex of a checking object.

④A relative position between the TDI image sensor and the checking object is moved, and the TDI image sensor is driven in synchronization with the relative movement.

⑤An image of the object is detected by way of the above-described techniques ① to ④. A positional shift between the detected image and an image of the previously detected pattern, or a reference pattern is corrected, and the images whose positional shift has been corrected are compared with each other.

In accordance with the above-described techniques ① to ③, the respective one-dimensional image sensors inside the TDI image sensor are focused at slightly different positions (Z positions) along a direction perpendicular to an optical axis. Furthermore, according to the technique ④, the respective one-dimensional image sensors can detect the same position (X position) along a direction parallel to the optical axis without any positional deviation. As a consequence, even when the higher stepped portions or concaves/convexes are contained in the object, the object is surely focused onto any surface of these one-dimensional image sensors. As a result, a sharp image signal having a large amplitude can be obtained. A fact whether or not there is a defect may be reflected in the output values of the one-dimensional image sensors. By way of the signal summing function performed by the TDI image sensor, the sharp image signal having a large amplitude is added to other image signals having small amplitudes and blurring components. These summation signals are compared with each other by way of the technique ⑤. Since any one of the output signals from the one-dimensional image sensors which can capture the defect is not blurred, but has a great difference from the normally operable part and a great amplitude, the defect is detectable by comparing the added signals with each other. In practical case, there is a slight magnification error (Y position) caused by focusing an image in a direction perpendicular to the moving direction in the respective one-dimensional image sensors. However, this magnification error can also be canceled by the technique ⑤, no problem. Further, the positional shift corrections are performed in parallel mode and the comparison is carried out, whereby highspeed checking operation can be achieved. As a result of these merits, even when a multi-layer pattern is checked in which concaves and convexes are formed by overlapping the respective layers, the high precision pattern detection and the high sensitive comparison can be performed within a short time, while the respective layers are focused. Accordingly, the defect detecting performance achieved by the present invention can be extremely improved, as compared with the conventional checking method/apparatus.

Thus, owing to the above-described combination of the image positioning/sensitivity controlling operation and the image detection employing the inclined image sensor, the defect detecting sensitivity is further improved, and even the very fine defects having sizes of approximately 0.1 µm to 0.2 µm may be detected.

BRIEF DESCRIPTION OF THE DRAWINGS

FIG. 2A is a schematic block diagram for indicating an example of a discrepancy detecting circuit shown in FIG. 1;

DESCRIPTION OF THE PREFERRED EMBODIMENTS

A description will now be made of preferred embodiments according to the present invention with reference to the accompanying drawings.

Figure 1:
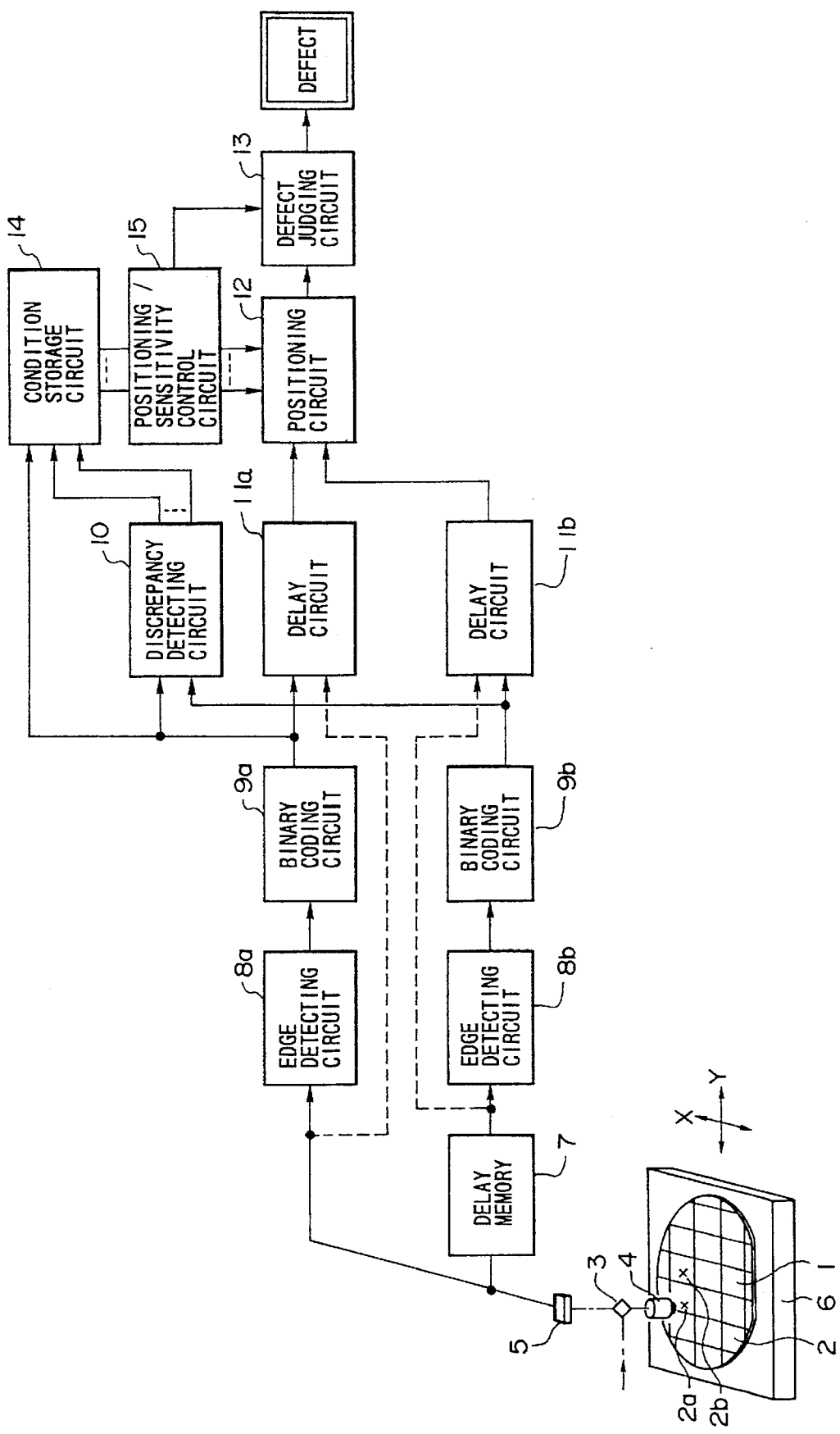
FIG. 1 is a schematic block diagram for representing a method and an apparatus for checking a pattern according to an embodiment of the present invention.

FIG. 1 is a schematic block diagram for representing a pattern checking method and an apparatus thereof according to one preferred embodiment of the present invention, in which the present invention has been applied to a pattern check on an LSI (large-scale integration) wafer.

In FIG. 1, reference numeral 1 denotes an LSI wafer; reference numerals 2, 2a, 2b indicate a chip; reference numeral 3 is a half mirror; reference numeral 4 shows an objective lens; reference numeral 5 denotes a linear image sensor functioning as an opto-photo converter; reference numeral 6 represents an X-Y table; reference numeral 7 is a delay memory; reference numerals 8a and 8b show edge detecting circuits; reference numerals 9a and 9b indicate binary coding circuits; reference numeral 10 indicates a discrepancy detecting circuit; reference numerals 11a and 11b show delay circuits; reference numeral 12 is a positioning circuit; reference numeral 13 indicates a defect judging circuit; reference numeral 14 denotes a condition storage circuit; and reference numeral 15 shows a positioning/sensitivity control circuit.

In FIG. 1, the LSI chip 1 having a plurality of chips (2a, 2b, - - - ) to be detected is mounted on the X-Y table 6, and this X-Y table 6 is moved, or transported along, for instance in, a Y direction. The chips on the LSI wafer 1 are arranged in the X direction and also in the Y direction, and each of these chips contain the same pattern. These patterns correspond to checking patterns which are used to check whether or not a defect is present therein.

Illumination light from a light source (not shown) is reflected at a half mirror 3, and then is illuminated via the objective lens 4 to the LSI wafer 1. Light reflected from the LSI wafer 1 travels through the objective lens 4 and the half mirror 3 and then is incident upon the linear image sensor 5 functioning as the opto-photo converter. The linear image sensor 5 has, e.g., 1024 pixels along one direction (for instance, the X direction in this preferred embodiment), and is employed to scan the patterns along the X direction. Patterns of the chips 2 are focused onto the linear image sensor 5, and are scanned in the X direction, whereby the checking patterns are detected as a two-dimensional image in conjunction with the transportation of the X-Y table 6 along the Y direction.

An image signal outputted from the linear image sensor 5 is delayed by the delay memory 7 by a time period during which the wafer 1 is transported by 1 chip size along the Y direction. As a result, both of the image signal outputted from the linear image sensor 5 and the image signal outputted from the delay memory 7 with the same timing as that of the first mentioned image signal correspond to image signals of the neighboring chips 2a and 2b. These two image signals derived from the sensor 5 and memory 7 are supplied to the respective edge detecting circuits 8a and 8b, so that pattern edges of these checking patterns are detected. Each of these edge detecting circuits 8a and 8b mounts thereon, for instance, a differential operator for detecting a dark pattern edge. The pattern edges detected by the edge detecting circuits 8a and 8b are binary-coded by the binary coding circuits 9a and 9b, respectively, and then delayed in the delay circuits 11a and 11b, whereby the resultant digital data are supplied to the positioning circuit 12. The binary-coded data of the binary coding circuits 9a and 9b are supplied to the discrepancy detecting circuit 10, and the binary-coded data of the binary coding circuit 9a is supplied to the condition storage circuit 14.

The discrepancy detecting circuit 10 is to detect a shift amount between the edges of the patterns indicated by the output signals from these binary coding circuits 9a and 9b. An example of the discrepancy detecting circuit 10 will now be explained with reference to FIG. 2A. In FIG. 2A, reference numerals 16a to 16f indicate shift registers; reference numerals 17a to 17g are shift registers used for serial-to-parallel conversions; reference numerals 18a to 18c and 19 are shift registers; reference numerals 20a to 20n indicate EXOR (exclusive OR gate) circuits; reference numerals 21a to 21n show counters; and reference numeral 22 represents a minimum value detecting circuit. It should be noted that the same reference numerals shown in FIG. 1 will be employed as those for denoting the same, or similar circuit elements.

Figure 2B:
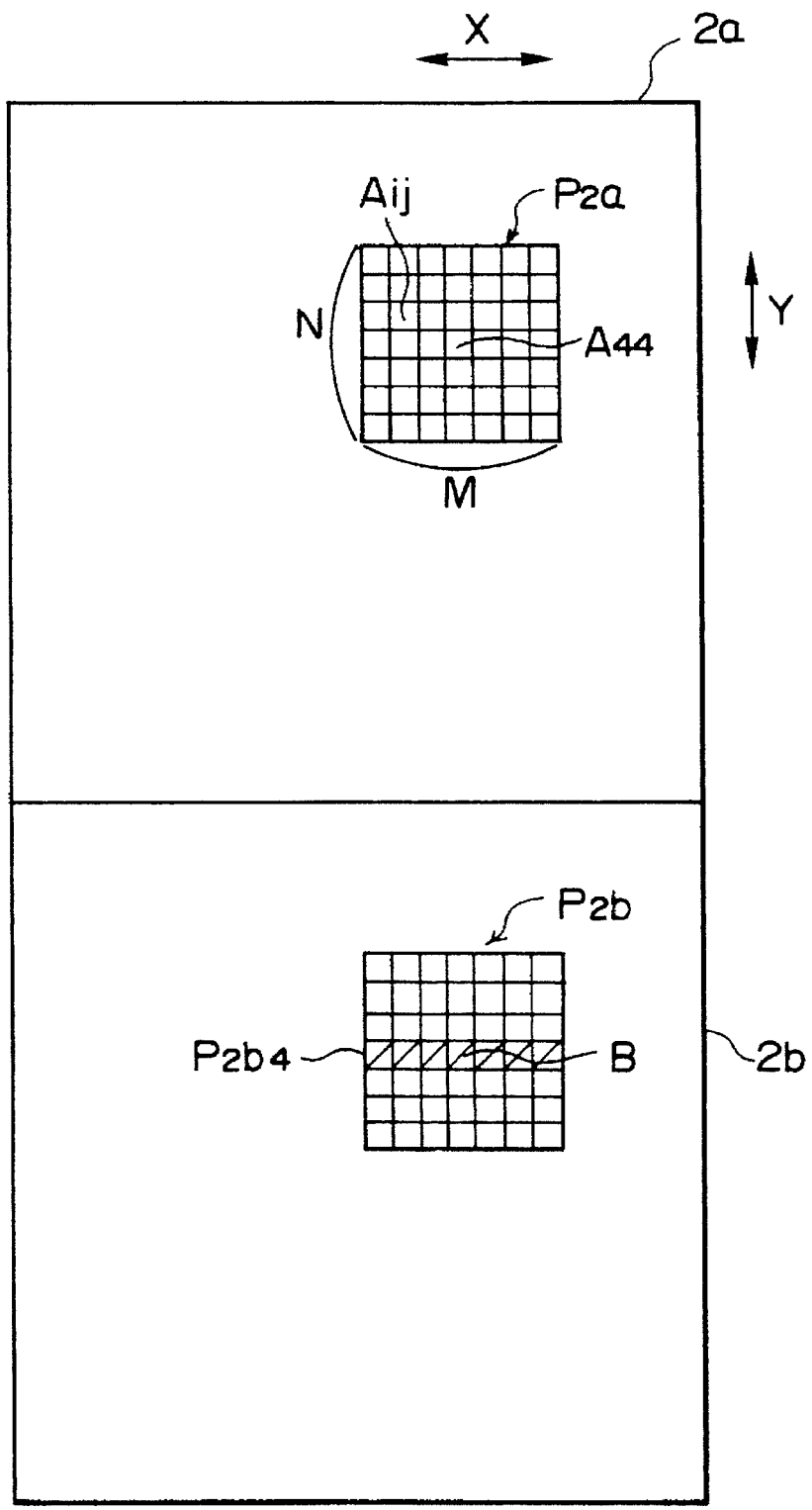
FIG. 2B is an illustration for explaining operations of the discrepancy detecting circuit shown in FIG. 1.

In FIG. 2A, the image signal of the binary coding circuit 9a is supplied to the shift register 17a, and also is successively supplied to the shift registers 16a to 16f in a serial mode, and then is sequentially delayed in the respective shift registers 16a to 16f by a time period corresponding to one scanning operation of the linear image sensor 5. The outputs of the respective shift registers 16a to 16f are furnished to the respective shift registers 17a to 17g. Each of these shift registers 17a to 17g is such a shift register arranged by, for instance, 7 stages of storage portions, and all of these shift registers output serial input information in a parallel form. Accordingly, from these shift registers 17a to 17g, a two-dimensional local image ("P$_{2a}$" shown in FIG. 2B) arranged by 7×7 pixels in an image (namely, a checking pattern of the chip 2a) indicated by the output signal from the binary coding circuit 9a, is cut out and outputted.

On the other hand, after the image signal outputted from the binary coding circuit 9b, has been delayed by a time period corresponding to three scanning operations of the linear image sensor 5 in the shift registers 18a to 18c, the delayed image signal is supplied to the shift register 19 constructed of 7 stages of the storage portions. As a result, an image "$P_{2b4}$" indicated by an inclined line shown in FIG. 2B, among the two-dimensional local image ($P_{2b}$, shown in FIG. 2B) arranged by 7×7 pixels, if inputted into the shift register 19. An image signal from the central storage unit (namely fourth stage) within this image $P_{2b4}$ is outputted from the shift register 19. As a consequence, if there is neither a defect, nor a positional shift in any one of the image signals from the linear image sensor 5 and the image signal from the delay memory 7, a content of a pixel outputted from the shift register 19 (will be referred to as a "pixel B") is equal to a content of a pixel outputted from the fourth storage portion of the shift register 17d at the same timing with that of the pixel B (will be referred to as a pixel "A44").

However, if the positional shift is present between the image signals of the above described pixels B and A44, a content of the pixel B outputted from the shift register 19 is not always coincident with that of the pixel A44 outputted from the fourth storage portion of the shift register 17d at the same timing therewith. Such a positional shift is detected by the discrepancy detecting circuit 10.

Thus, in FIG. 2A, the outputs from the respective storage portions of the respective shift registers 17a to 17g are sequentially supplied into one input terminal of each of 7×7 EXOR circuits 20a, 20b, - - -, 20n in the order of the first shift register 17a, whereas the output from the shift register 19 is supplied to the other input terminals of each of the EXOR circuits. The outputs of the EXOR circuits 20a to 20n become "L" when two input signals thereof are equal to each other, and become "H" when these input signals are different from each other. In other words, the EXOR circuits 20a to 20n detect a "coincidence" and a "discrepancy" between the output of each of the shift registers 17a to 17g and the output of the shift register 19.

The counter 21a counted up by only 1 when the output of the EXOR circuit 20a becomes "H" (discrepancy). Similarly, the counters 21b, 21c, - - -, 21n count up by only 1 when the outputs of the respective EXOR circuits 20b, 20c, - - -, 20n become "H". Also, the count values of these counters 21a to 21n are cleared (i.e., become zero) every time the linear image sensor 5 is scanned for N scanning operations. That is to say, the respective counters 21a to 21n count the number of discrepancies detected by the corresponding EXOR circuits 20a to 20n, while the linear image sensor 5 is scanned N times.

The reason why the counting operation is carried out when the linear image sensor 5 is scanned N times, is to prevent the positional shifts from being adversely influenced by existence of defects or the like.

When the counters 21a to 21n perform the counting operations during the N scanning periods of the linear image sensor 5, these count values just before the zero-clear operations are fetched into the minimum value detecting circuit 22. This minimum value detecting circuit 22 detects the minimum count value among the count values of the counters 21a to 21n; judges a pixel Aij from the corresponding shift registers 17a to 17g; and judges positional shifts $\Delta X_1$, $\Delta Y_1$ of this pixel Aij with respect to the pixel A44 in unit of pixels in the X and Y directions (FIG. 1). When the pixel Aij is equal to the pixel A44, it is assumed that both of the positional shift amount $\Delta X_i$ in the X direction and the positional shift amount $\Delta Y_i$ in the Y direction are equal to zero, and no positional shift is present within the output signals from the binary coding circuits 9a and 9b. Here, when the shift amount $\Delta X_1 < 0$, the output signal of the binary coding circuit 9a is led with respect to the output signal of the binary coding circuit 9b along the X direction (i.e., the scanning direction of the linear image sensor 5), whereas when the shift amount $\Delta Y_1 < 0$, the output signal from the binary coding circuit 9a is led with respect to that from the binary coding circuit 9b along the Y direction (namely, the travel direction of the stage 6 shown in FIG. 1). As a consequence, in the example of FIG. 2B, the shift amounts $\Delta X_1$, $\Delta Y_1$ of the pixel Aij are −2, −1 respectively with respect to the pixel A44.

It should be noted that the minimum value detecting circuit 22 detects not only the minimum value among the count values of the counters 21a to 21n, but also detects a second minimum count value and also a third minimum count value, and then judges positional shift amounts of the respective pixels with respect to the pixel A44. It is assumed that symbols $\Delta X_2$ and $\Delta Y_2$ correspond to a positional shift amount of the pixel having the second minimum count value.

Although the size of the two-dimensional local image to be cut out may be arbitrarily determined, in case of the image arranged by 7×7 pixels as shown in FIG. 2B, the above-described shift amounts $\Delta X$ and $\Delta Y$ are given as follows:

$$|\Delta X| \leq 3 \text{ and } |\Delta Y| \leq 3.$$

The shift amounts $\Delta X_1$, $\Delta X_2$, - - -, $\Delta Y_1$, $\Delta Y_2$, - - - which have been obtained by the minimum value detecting circuit 22 in accordance with the above-explained manner are supplied to the condition storage circuit 14 shown in FIG. 1.

It should be noted that since the discrepancy detecting circuit 10 detects the above-described shift amounts every time the linear image sensor 5 is scanned N times, the delay amounts of the delay circuits 11a and 11b are selected to a time period required for the N scanning operations of the linear image sensor 5 in conformity to the N-time scanning, as described above.

In FIG. 1, the condition storage circuit 14 stores both of the shift amounts $\Delta X_1$, $\Delta X_2$, - - -, $\Delta Y_1$, $\Delta Y_2$, - - - derived from the discrepancy detecting circuit 10 and the number of discrepancy pixel (namely, count values of the counters 21a to 21n shown in FIG. 2A). Assuming now that the number of pixels constituting the linear image sensor 5 is "M", to detect the above-described shift amounts by the discrepancy detecting circuit 10, the linear image sensor 5 has been scanned N times during which N×M areas have been scanned by this linear image sensor 55. Every time are N×M areas are scanned by the linear image sensor 5, the binary coding circuit 9a also calculates an area of pattern edges within the N×M areas, and this calculated area value is also stored in the condition storage circuit 14. The positioning/sensitivity control circuit 15 controls both of the positioning circuit 12 and the defect judging circuit 13 based on the information stored in the condition storage circuit 14.

Figure 3:
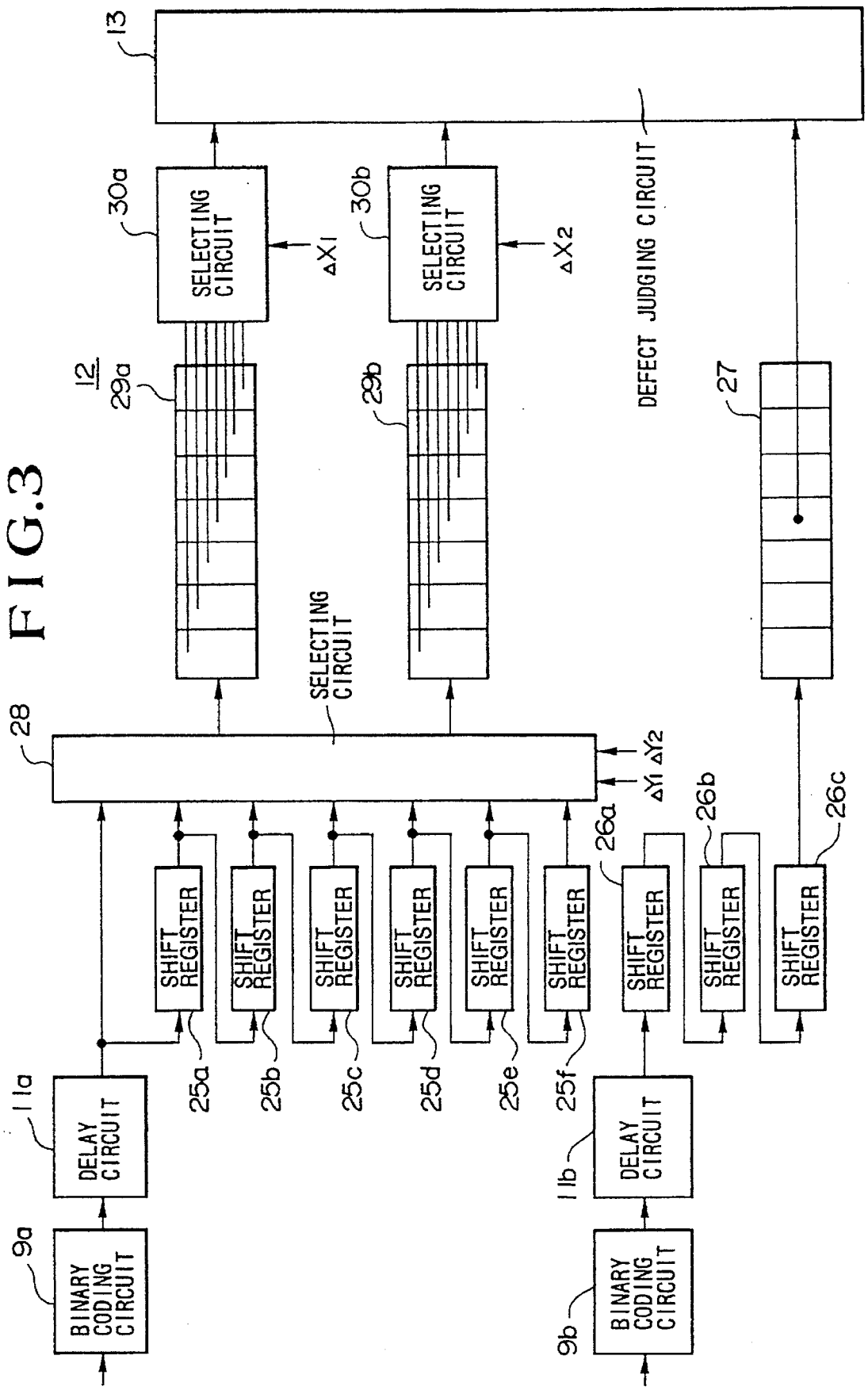
FIG. 3 is a schematic block diagram for showing an example of a positioning circuit shown in FIG. 1.

FIG. 3 is a schematic block diagram for showing an example of the positioning circuit 12 shown in FIG. 1. In this drawing, reference numerals 25a to 25f, 26a to 26c and 27 are shift registers; reference numeral 28 denotes a selecting circuit; reference numerals 29a and 29b are registers and reference numerals 30a and 30b denote selecting circuits. It should be noted that like reference numerals of FIG. 3 represent identical or similar circuit elements shown in FIG. 1.

In FIG. 3, a signal outputted from the delay circuit 11a is supplied to the selecting circuit 28, and also sequentially delayed by 6 shift registers 25a, 25b, - - - , 25f by one scanning time period of the linear image sensor (FIG. 1). Output signals of these shift registers 25a to 25f are also supplied to the selecting circuit 28, respectively. Under control of the positioning/sensitivity circuit 15, the selecting circuit 28 selects one of the output signals from the delay circuit 11a and the shift registers 25a to 25f, which corresponds to the positional shift amount $\Delta Y_1$ in accordance with the shift amount $\Delta Y_1$ stored in the condition storage circuit 14, and then supplies the selected output signals to the shift register 29a constructed of a 7-stage storage portion. Furthermore, this selecting circuit 28 may select one of the output signals from the delay circuit 11a and the shift registers 25a to 25f, which corresponds to the positional shift amount $\Delta Y_2$, and then may supply the selected one output signal to the shift register 29b arranged by a 7-stage storage portion. When the shift amount $\Delta Y_1$ and $\Delta Y_2$ correspond to zero, the selecting circuit 28 selects the output from the shift register 25c. When the shift amounts $\Delta Y_1$ and $\Delta Y_2$ are positive, the selecting circuit 28 selects any output signals from the delay circuit 11a and the shift registers 25a and 25b, which correspond to the positional shift amounts. When the shift amounts $\Delta Y_1$ and $\Delta Y_2$ are negative, the selecting circuit 28 selects any output signals from the shift registers 25d to 25f, which correspond to the shift amounts. It is of course possible that when $\Delta Y_1 \times \Delta Y_2$, the information stored in the shift registers 29a and 29b is equal to each other.

The functions of the shift registers 29a and 29b output serial inputs as parallel outputs. Under control of the positioning/sensitivity control circuit 15, the selecting circuit 30a selects the output signal corresponding to the shift amount $\Delta X_1$ stored in the condition storage circuit 14 among the output signals from the respective stages of the shift register 29a, whereas the selecting circuit 30b similarly selects the output signal corresponding to the shift amount $\Delta X_2$ stored therein among the output signals from the respective output stages of the shift register 29b. When the shift amount $\Delta X_1$ becomes zero, the selecting circuit 30a selects the output signal of the fourth stage of the shift register 29a; when $\Delta X_1 > 0$, selects any one of the output signals from the 1st to 3rd stages of the shift register 29a, which correspond to this shift amount $\Delta X_1$; and when $\Delta X_1 < 0$, selects any one of the output signals from the 5th to 7th stages of the shift register 29a, which corresponds to the shift amount $\Delta X_1$.

As previously explained, such an output pattern edge of the delay circuit 11a which has been shifted by $\Delta X_1$ along the X direction and by $\Delta Y_1$ along the Y direction, is obtained from the selecting circuit 30a, and also such an output pattern edge of the delay circuit 11a which has been shifted by $\Delta X_2$ along the X direction and by $\Delta Y_2$ along the Y direction, is obtained. These output signals are supplied to the defect judging circuit 13.

On the other hand, the output signal from the delay circuit 11b is sequentially delayed by three shift registers 26a, 26b and 26c by every 1 scanning period of the linear image sensor 5, and the delayed signals are supplied to the shift register 27 constructed of the 7-stage storage portion. A pixel is outputted from the fourth-stage storage portion of this shift register 27 and then supplied to the defect judging circuit 13. The pixel outputted from this shift register has a time delay equal to that of the pixel outputted from the fourth-stage storage portion of this shift register 29a when the selecting circuit 28 selects the output signal from the shift register 25c and then supplies this signal to the shift register 29a.

Thus, when $\Delta X_1 = \Delta Y_1 = 0$, the timing relationship between the outputs of the delay circuits 11a and 11b is identical to the timing relationship between the outputs of the selecting circuit 30a and the shift register 27. When at least one of these shift amounts $\Delta X_1$ and $\Delta Y_1$ is not equal to zero, the output pixel of the selecting circuit 30a has been delayed by a time delay amount ($=\Delta X_1 + \Delta Y_1$) different from that of the output pixel of the shift register 27. This implies that with regard to the edge pattern by the output signal of the delay circuit 11b, the edge pattern by the output signal from the delay circuit 11a is positionally shifted by $\Delta X_1$ along the X direction and also $\Delta Y_1$ along the Y direction, and then outputted from the selecting circuit 30a.

As a consequence, the pixels of the edge pattern which have been positionally shifted by $\Delta X_1$ and $\Delta Y_1$, which is outputted from the delay circuit 11a, are sequentially obtained from the selecting circuit 30a, whereas the pixels of the edge pattern which have been positionally shifted by $\Delta X_2$ and $\Delta Y_2$, are sequentially obtained from the selecting circuit 30b. Further, the pixels of the edge pattern indicative of the output signal from the delay circuit 11b are successively obtained from the shift register 27. It should be understood that both of the shift register 29b and the selecting circuit 30b may be omitted, and only the pixels of the edge pattern from the selecting circuit 11a, which has been shifted by $\Delta X_1$ and $\Delta Y_1$ may be obtained. Furthermore, the pixels of the edge patterns which have been positionally shifted by $\Delta X_3$, $\Delta Y_3$, may be obtained.

Figure 4:
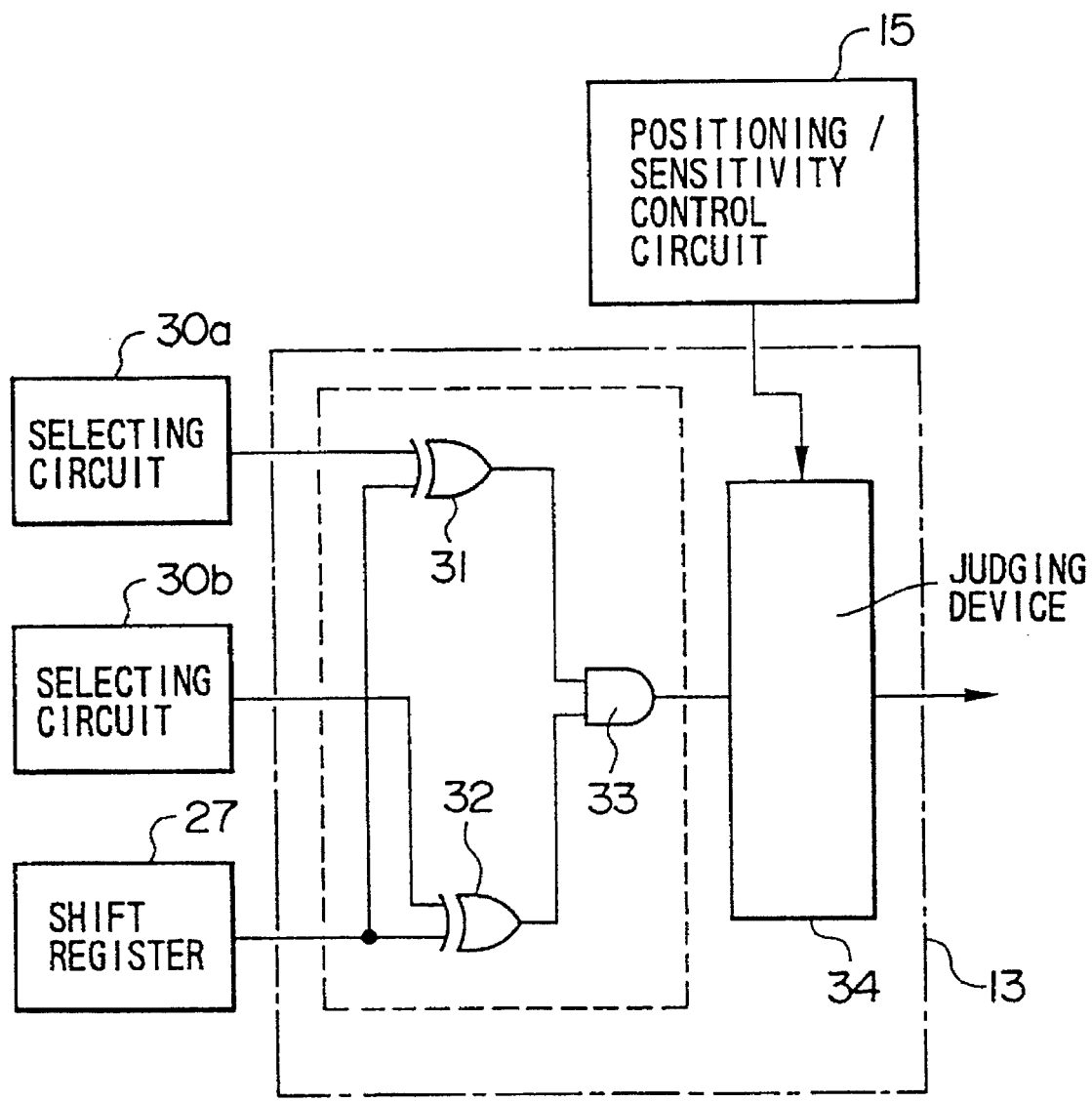
FIG. 4 is a schematic block diagram for representing an example of a defect judging circuit shown in FIG. 1.

FIG. 4 is a schematic diagram of an example of the defect judging circuit 13 shown in FIG. 1, which is employed for the positioning circuit 12 shown in FIG. 3. In this figure, reference numerals 31 and 32 indicate EXOR circuits; reference numeral 33 indicates an AND gate, and reference numeral 34 denotes a judging device. It should be noted that like reference numerals shown in FIGS. 1 and 3 refer to like circuit elements in FIG. 4.

In FIG. 4, the output signal from the selecting circuit 30a shown in FIG. 3 is compared with the output signal from the shift register 27 to check a coincidence by the EXOR circuit 31. If these signals are not coincident with each other, namely discrepancy, the output of the EXOR circuit 31 becomes "H". Similarly, the output signal from the selecting circuit 30b is compared with the output signal from the shift register 27 so as to check a coincidence by the EXOR circuit 32. When these output signals are not coincident with each other, the output from the EXOR circuit 32 becomes "H". The outputs from the EXOR circuits 31 and 32 are supplied to the AND gate 33, and when the outputs from these EXOR circuits 31 and 32 become "H" at the same time, the output from the AND gate becomes "H".

In accordance with this operation, a pixel position where the output pattern edge of the shift register 27 is not coincident with the output pattern edges of the selecting circuit 30a and 30b at the same time, is detected by the EXOR circuits 31 and 32, and also the AND gate 33. The judging device 34 detects a size of a group of the pixel positions "H" from the output of the AND gate 34, and further checks whether or not this group corresponds to a defect.

The reason why a point where two edge patterns which are made by shifting the other edge pattern with respect to one edge pattern are not coincident with each other at the same time, is as follows:

That is, generally, it is conceived that both of the edge pattern from the delay circuit 9b and the positioned edge pattern by way of the positioning circuit 12 are positioned most adjoining the edge pattern from this delay circuit 9b with respect to the smallest count value of the discrepancy detecting circuit 10. If so, then the defect can be detected by checking the discrepancy by comparing these edge patterns with each other.

However, this case is applied only to no image distortion in the edge pattern. Practically, for instance, in FIG. 1, there is such a case that the objective lens 4 is vibrated in the vertical direction in order to perform a focusing operation, whereby sizes of patterns focused onto the linear image sensor 5 may be varied. Also, there are variations in the transportation of the X-Y table 6 so that the image signal outputted from the linear image sensor 5 contains distortion, and also this distortion may vary. In such a case, the edge patterns outputted from the delay circuits 11a and 11b contain different distortions, so that even when these edge patterns are tried to be positioned by the positioning circuit 12, these corresponding pixels are not completely positioned with each other.

In FIG. 1, since the dimensions and patterns of the chips 2 formed on the LSI wafer 1 are identical to each other, a shift amount (will be referred to a "present shift amount") used in the positioning circuit 12 for the N×M areas read by the linear image sensor 5 during the present scanning operation must be coincident with a shift amount (will be referred to a "preceding shift amount") used therein for the N×M areas read by the linear image sensor 5 during the preceding scanning operation.

However, there are some cases that the present shift amount is not coincident with the preceding shift amount. Various reasons may be conceived that the patterns of the LSI wafer 1 is expanded, or positionally shifted, otherwise the positional shift detection by the discrepancy detecting circuit fails. In such a case, if the N×M areas which is to be checked during the present scanning operation are positioned based upon such a shift amount obtained by investigating this area, the defect may be erroneously detected.

In this preferred embodiment, the condition storage circuit 14 is employed so as to judge whether or not the present shift amount is coincident with a shift amount obtained at a specific time instant, for example, the preceding shift amount in conjunction with the positioning/sensitivity control circuit 15, whereby both of the positioning circuit 12 and the defect judging circuit 13 are controlled to solve the above-explained problem. A description will not be made of this point.

Figure 5:
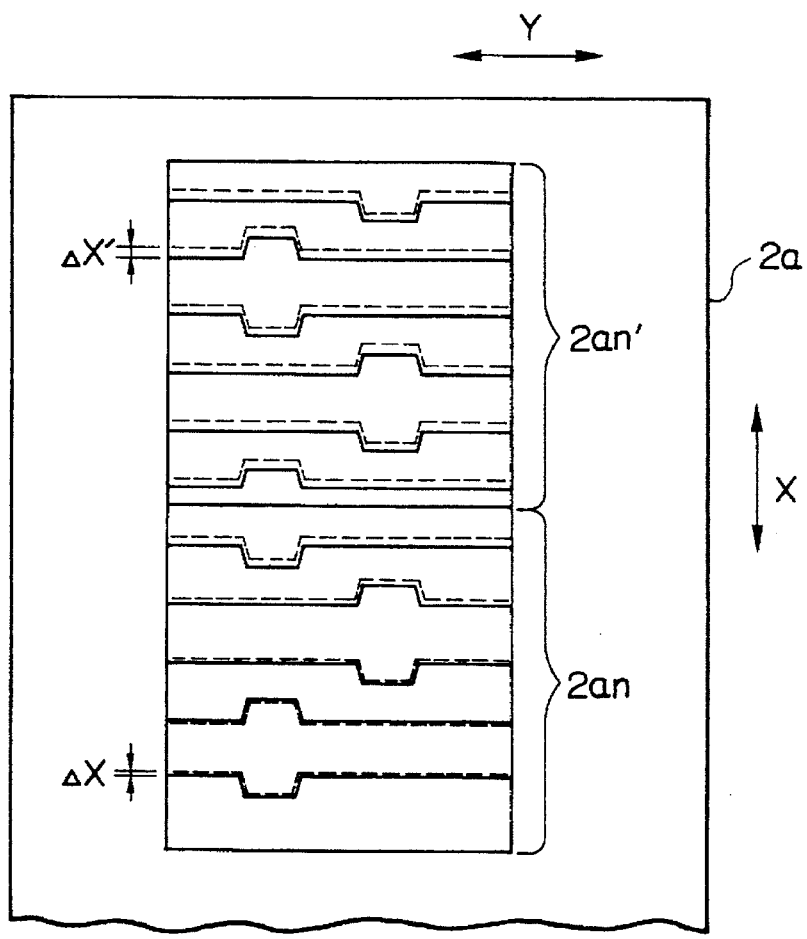
FIG. 5 is an illustration for showing one example of both a current image pattern and a preceding image pattern, which are acquired by a linear image sensor and used to explain an erroneous detection for a pattern defect.

In FIG. 5, there is shown one example of a preceding image 2an' of the wafer 2a sensed by the image sensor, and a current image 2an thereof, and symbols $\Delta X'$ and $\Delta X$ indicate a preceding shift amount and a present shift amount, respectively.

The condition storage circuit 14 has previously stored the shift amounts until the preceding scanning operations, and also stores the current shift amount obtained in the discrepancy detecting circuit 10, and furthermore stores an area of edge patterns (i.e., number of pixels constructing the edge) within the N×M areas, which is calculated by the binary coding circuit 9a. Then, with respect to the relationship between the current shift amount and the preceding shift amount, the following operation is carried out.

(1) In case that the current shift amount is not coincident with the preceding shift amount, the defect detection is performed by employing the preceding shift amount.

Assuming now that the current shift amounts are $\Delta X_1$, $\Delta X_2$, - - - , $\Delta Y_1$, $\Delta Y_2$, - - - , and the preceding shift amounts are $\Delta X'_1$, $\Delta X'_2$, - - - , $\Delta Y'_1$, $\Delta Y'_2$, - - - the positioning circuit 12 shown in FIG. 3 obtains also the pattern edges which have been shifted in accordance with not only the current shift amounts $\Delta X_1$, $\Delta X_2$, - - - , $\Delta Y_1$, $\Delta Y_2$, - - - , but also the preceding shift amounts $\Delta X'_1$, $\Delta X'_2$, - - - , $\Delta Y'_1$, $\Delta Y'_2$, - - -

, under control of the positioning/sensitivity control circuit 15 (FIG. 1), and supplies these pattern edges to the defect judging circuit 13 so as to process these pattern edges with the pattern edges from the shift register 27 in the EXOR circuits 31 and 32, the resultant signals being supplied to the AND gate 33.

In accordance with the above-described process operation, the discrepant pixel commonly indicated by the pattern edges which have been positioned based upon both of the current shift amount and the preceding shift amount, is judged as the defect, so that the erroneous positioning may be prevented beforehand and thus erroneous detection of a normally operable unit as being defective may be suppressed. It should be noted that one pair of shift amounts may be employed, or plural pairs of shift amounts may be employed, otherwise one pair of current shift and plural pairs of preceding shift amounts may be employed, or vice versa. This relationship will be similarly applied to the following embodiments.

(2) The positioning operation is carried out at a large number of positioning points when the current shift amount is greatly different from the shift amounts until last scanning operations, namely a change in the shift amounts becomes great, for instance, as to the shift amount corresponding to the minimum number of discrepant pixel of the counter 21 (i.e., the count value of the counter 21) shown in FIG. 2A, a difference between the current minimum shift amount and the preceding minimum shift amount is greater than a predetermined value, e.g., more than two pixels, or when the pattern density is lower than a predetermined value. It should be noted that this shift variation amount and the pattern density and the like will be referred to as "pattern information". Further, pattern density is defined as the number of patterns. For instance, the pattern density is low in the circuit around the decoder, whereas the pattern density is high when the patterns are constructed in a multi-layer.

That is, in the positioning circuit 12 shown in FIG. 3, not only the current shift amounts $\Delta X_1$, $\Delta X_2$, - - - , $\Delta Y_1$, $\Delta Y_2$, - - - , but also predetermined specific shift amounts $\Delta X''_1$, $\Delta X''_2$, - - - , $\Delta Y''_1$, $\Delta Y''_2$, - - - are shifted, and then the discrepancy which commonly appears in these shift amounts is detected as the defect in a similar manner to the above case.

Figure 6:
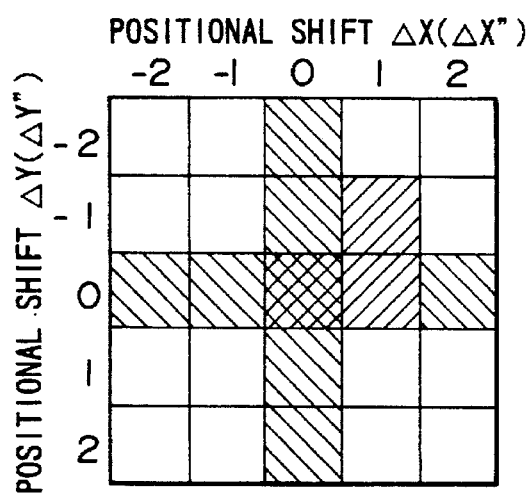
FIG. 6 is an illustration for showing one example of a predetermined shift amount used to explain an example of the positioning operation effected in the above-described embodiments.

FIG. 6 represents one example of the above-described specific shift amount.

In FIG. 6, a shift amount indicated by hatching lines inclined rightwardly corresponds to specific shift amounts ($\Delta X''$, $\Delta Y''$) which are (0, −2), (−2, 0), (−1, 0), (1, 0), (2, 0), (0, −1), (0, 0), (0, 1) and (0, 2). Assuming now that the current shift amount ($\Delta X$, $\Delta Y$) is expressed by hatching lines inclined leftwardly and is selected to (0, 0), (1, −1) and (1, 0), the positioning circuit 12 shown in FIG. 3 performs the positioning operation for these shift amounts, and judges as the defect the discrepant pixels commonly indicated by these shift amounts, as described above. No care is taken to the specific shift amounts (0, 0) and (1, 0) which is coincident with the current shift amount. The preceding shift amount ($\Delta Y'$) may be employed.

(3) When there is a great difference in the current shift amount, as compared with the reference shift amount, the positioning operations are executed at a large number of positioning points. In other words, in FIG. 3, when a comparison is made between the current shift amounts $\Delta X_1$, $\Delta X_2$, - - - , $\Delta Y_1$, $\Delta Y_2$, - - - , and the reference shift amount, and at least one current shift amount is greatly different from the reference shift amount, the shift amounts $\Delta X''_1$, $\Delta X''_2$, - - - , $\Delta Y''_1$, $\Delta Y''_2$ are also selected which have been separately determined as shown in FIG. 16, the pattern edges are extracted with respect to a large number of shift amounts and then the discrepancy commonly expressed is judged as the defect.

(4) Also when the number of discrepant pixels which are detected in the discrepancy detecting circuit 10 is greatly different from the number of discrepant pixels which have been detected until the preceding scanning operation, as explained above, the positioning operation is carried out at the large number of positioning points, since it is conceived that only the positional shift correction during the present scanning operation is not sufficient. In this case, the number of discrepant pixel may be divided by the pattern edge area derived from the binary coding circuit 9a so as to be normalized by the positioning/sensitivity control circuit 15, and a comparison may be performed as to the normalized number of discrepant pixel. Further, the positioning points may be set by the above combination.

In accordance with this operation, erroneous positioning operations occurring at such places where the pattern density is small, and a large pattern defect is present, can be prevented. Thus, erroneous detection of a normal pattern portion as being defective can be reduced. Also, even when there is a positional shift due to image distortions, the correct positioning operation may be realized.

Although the above operation is to prevent erroneous detection by increasing the sort of shift amounts, the defect detecting sensitivity may be varied.

Figure 7:
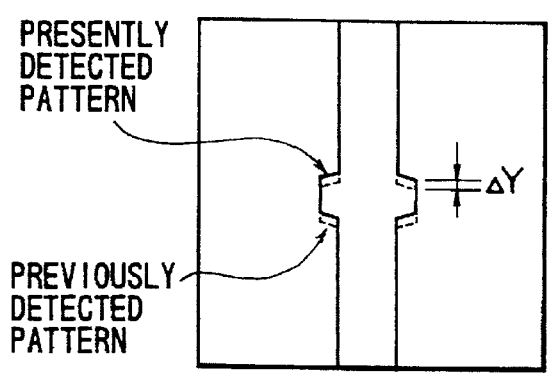
FIG. 7 is an illustration for representing one example of both a current image pattern and a preceding image pattern, which are acquired by a linear image sensor and used to explain an erroneous detection for a pattern defect.

That is to say, (5) when the current shift amount is greatly different from the preceding shift amounts, or the pattern density is low, the defect detecting sensitivity by the judging circuit 34 shown in FIG. 4 may be changed. There is such a case as shown in FIG. 7, where the pattern density is small, and reliability in a shift amount between the presently detected pattern (solid line) and the previously detected pattern (dot line) is low. In other words, in these cases, the judging device 34 judges whether or not the output signal from the AND gate 33 corresponds to the defect based upon the detected size thereof. Assuming now that the judging size is set to twice of the above size, for instance, and such a discrepancy having a size of more than 3×3 pixels has been conventionally judged as the defect, the defect detecting sensitivity is lowered in such a way that discrepancy having a size of more than 6×6 pixels is judged as defect. As a consequence, erroneous detection of a normal pattern portion as being defective can be prevented.

Similarly, ( 6) when the present shift amount is greatly different from the reference shift amount, a predetermined defect detecting sensitivity is replaced in a similar manner to the above case.

Also, (7) when the quantity of discrepant pixels which is presently detected is largely different from the number of discrepant pixels, a preselected defect detecting sensitivity is similarly changed. The number of discrepant pixels to be compared may be divided by the area of pattern edge to obtain the normalized pixel number. It may be a function of the number of discrepant pixel.

As described above, even when the correct positioning operation cannot be executed, an occurrence of erroneous detection of a normal pattern portion as being defective can be prevented. That is, since the error detecting ratio may be reduced, as compared with the conventional error detecting ratio, the defect detecting sensitivity higher than the normal defect detecting sensitivity can be set. As a result, the defect detecting sensitivity may be increased.

As previously described, the discrepancy pixels present within the M×N areas calculated by multiplying the pixel number "M" by the scanning number "N" of the linear image sensor 5 may be recognized by the discrepancy detecting circuit 10, and also the shift amounts under which the number of discrepancy pixel becomes minimum can be recognized by counting the number of discrepant pixels at the respective shift amounts when the input pattern is positionally shifted by ±0 to 3 pixels along the X and Y directions. In this case, the objective lens 4 shown in FIG. 1 must be automatically focused in order to detect an image at high precision, and a Z stage (not shown) must be moved along a Z direction (direction perpendicular to the X and Y planes). Since the transportation of the Z stage contains unnecessary operation such as displacement within the X-Y plane, this must be permitted. As a consequence, in case that a displacement amount of the Z stage exceeds a preset value when the number of discrepancy pixel within the M×N areas is calculated, this displacement value may be reflected in positioning of the image. Thus, when the displacement value in the Z direction exceeds a preset value while detecting the images of the M×N areas, the positioning operation is carried out at more large number of positioning points. Otherwise, when the displacement value in the Z direction exceeds this preset value while detecting the images within the M×N areas, a predetermined defect detecting sensitivity is changed. As a result, the defect detecting sensitivity is lowered and the occurrence of erroneous detection that a normal pattern portion is detected as the defect may be suppressed.

As previously explained, either the image positioning operation, or the setting of the defect detecting sensitivity is varied based upon the pattern matching results of the images, the pattern density and the Z displacement.

It should be noted that the defect of the edge pattern of the image which has been binary-coded in the binary coding circuits 9a and 9b is detected in the above-described preferred embodiment. On the other hand, as shown by the dot line of FIG. 1, the outputs of the image sensor 5 and the delay memory 7 may be directly supplied to the delay circuits 11a and 11b, and a digitized gray scale image data may be employed so as to detect the defect. In this case, a region whose variable density is great may be detected as the defect. As a result, as previously explained, the defect detecting sensitivity may be changed by varying this judgement threshold value. It should be noted that the output from the binary-coding circuit 9a is supplied only to the discrepancy detecting circuit 10 and the condition storage circuit 14.

While the preferred embodiment of the present invention has been described in detail, the respective constructive elements may be realized by way of the conventional techniques. Although the linear image sensor is employed in the above-described preferred embodiment, a two-dimensional image sensor which will be employed in the following preferred embodiment, may be used to sense an image while the stage is continuously transported, resulting in a similar advantage to that of the above-explained preferred embodiment. Although the above-described detecting method employs a single image sensor, the present invention may be applied to such a detecting method for comparing two adjoining images which have been detected at the same time with employment of two image sensors, and also to a detecting method in which a time delay and integration (TDI) type CCD is employed as the image sensor, which will be used in the following preferred embodiment.

As previously explained, in accordance with the above-described preferred embodiment, the erroneous detection for detecting as the defect the normal pattern portion, caused by the positioning states, can be reduced, reliability in the detection may be improved, and the erroneous detection of the normal pattern portion may be suppressed by, for instance, more than 1 order, as compared with the conventional erroneous detection, whereby such a fine defect having a size of 0.1 µm to 0.2 µm may be detected and the detecting precision may be increased.

Figure 8:
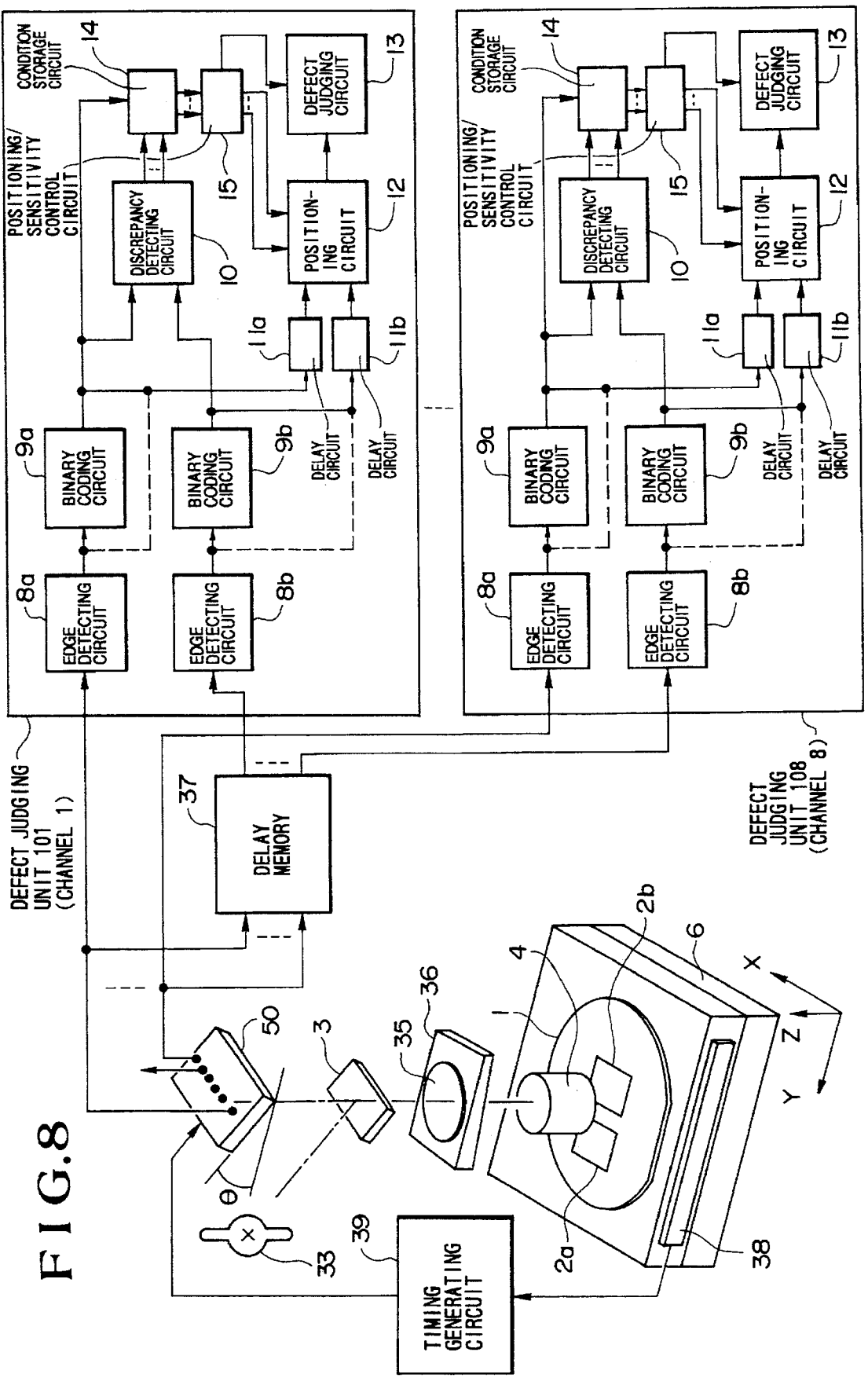
FIG. 8 is a schematic block diagram for representing a pattern checking method and an apparatus thereof according to another embodiment of the present invention.

Another preferred embodiment of the present invention will now be explained with reference to FIGS. 8 to 12C. FIG. 8 represents a pattern checking apparatus according to this preferred embodiment. In FIG. 8, the same reference numerals shown in FIGS. 1 to 7 will be employed as those for denoting the same or similar circuit elements, and explanations thereof will be omitted.

In this drawing, reference numeral 50 indicates a time delay and integration type CCD (charge-coupled device) image sensor. This TDI (time delay and integration) image sensor has such a structure that a plurality of 1-dimensional image sensors are arranged in a two-dimensional form, and has such a function to increase a light amount of detection in such a manner that the outputs of the respective 1-dimensional image sensors are time-delayed by a predetermined time period, and then the delayed outputs are successively added to the outputs from the adjoining 1-dimensional image sensors for sensing the same position of an object. The ideas of this sort of image sensors have been described in U.S. Pat. No. 3,833,762 to Gudmundsen issued on Sep. 3, 1974. These image sensors are commercially available by the Canadian firm, DALSA INC. in the name of LT-F2-2048, and by the U.S. firm, RETICON LTD.

Figure 9:
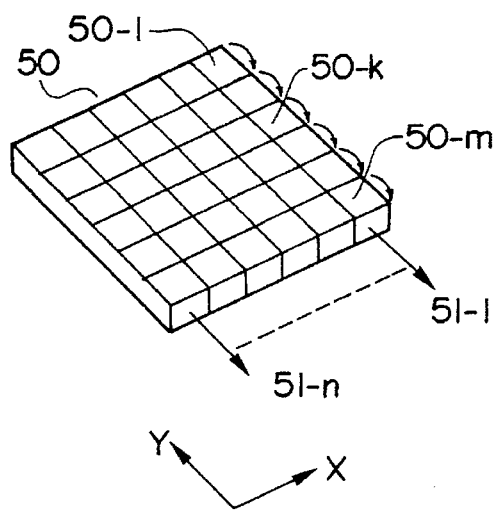
FIG. 9 is an illustration for describing the function of the TDI image sensor shown in FIG. 8.

As shown in FIG. 9, one example of such a TDI image sensor is so constructed that "m(e.g., 96)" pieces of one-dimensional image sensors 50-1 to 50-n are arranged along, for instance, a Y direction in a parallel form; each of these one-dimensional image sensors owns 2048 pixels along, for instance, an X direction; this one-dimensional image sensor is subdivided into, for example, 8 channels (1 channel =256 pixels); as described above, the outputs from "m" pieces of image sensors are sequentially added to each other every channel; and then the added signals are obtained as the output signals 51-1 to 51-n (n=8).

As shown in FIG. 8, this TDI image sensor 50 is arranged with being inclined by an angle "θ" with respect to a plane perpendicular to an optical axis. An inclined direction is a direction normal to a longitudinal direction (X direction) of the plural one-dimensional image sensors under condition that a center of the TDI image sensor is used as a fulcrum. An inclination amount corresponds to an amount of concave and convex in an object. For instance, since convex and concave of a multilayer pattern of an LSI wafer are 1 to 3 µm approximately, the TDI image sensor is inclined by 1.6 to 4.8 mm equal to such an inclination amount calculated by multiplying the magnification "M" of the employed objective lens 4 by a power, for instance, by multiplying 40 of the objective lens by 1600. It is apparent that this inclination amount may depend upon the performances of the employed automatic focusing mechanism (not shown), and therefore the objective lens may be inclined only by an amount to cover this range. That is, if the focusing precision is not good, depending upon an object to be checked, an inclination amount "θ" is slightly increased. A pattern to be checked (namely checking pattern) can be detected as a two-dimensional image in such a way that for instance, the scanning operation of one-dimensional image sensor inside the TDI image sensor inclined in the above-described manner is coincident with the scanning direction in the X direction; and as a result, the LSI wafer 1 corresponding to the checking pattern may be detected via the objective lens 4 in one dimensional field, and furthermore this LSI wafer 1 is moved by the X-Y table 6 along a direction perpendicular to the major scanning direction of the TDI image sensor 50, namely along the Y direction. It should be noted that the LSI wafer 1 is being illuminated by an illuminating lamp 33. A linear scale 38 is mounted on the X-Y table 6, so that the actual positions of the LSI wafer 1 can be correctly detected. In response to an output signal indicative of a position and derived from the linear scale 38 by a timing generating circuit 39, a start timing signal representative of a pixel is generated, and the TDI image sensor 50 is driven in response to this start timing signal every time the X-Y table is transported over a constant distance. For instance, when a pixel size is 0.15 µm, every time the wafer is moved along the Y direction over 0.15 µm, the start timing signal is produced and then the image sensor is driven.

Figure 10:
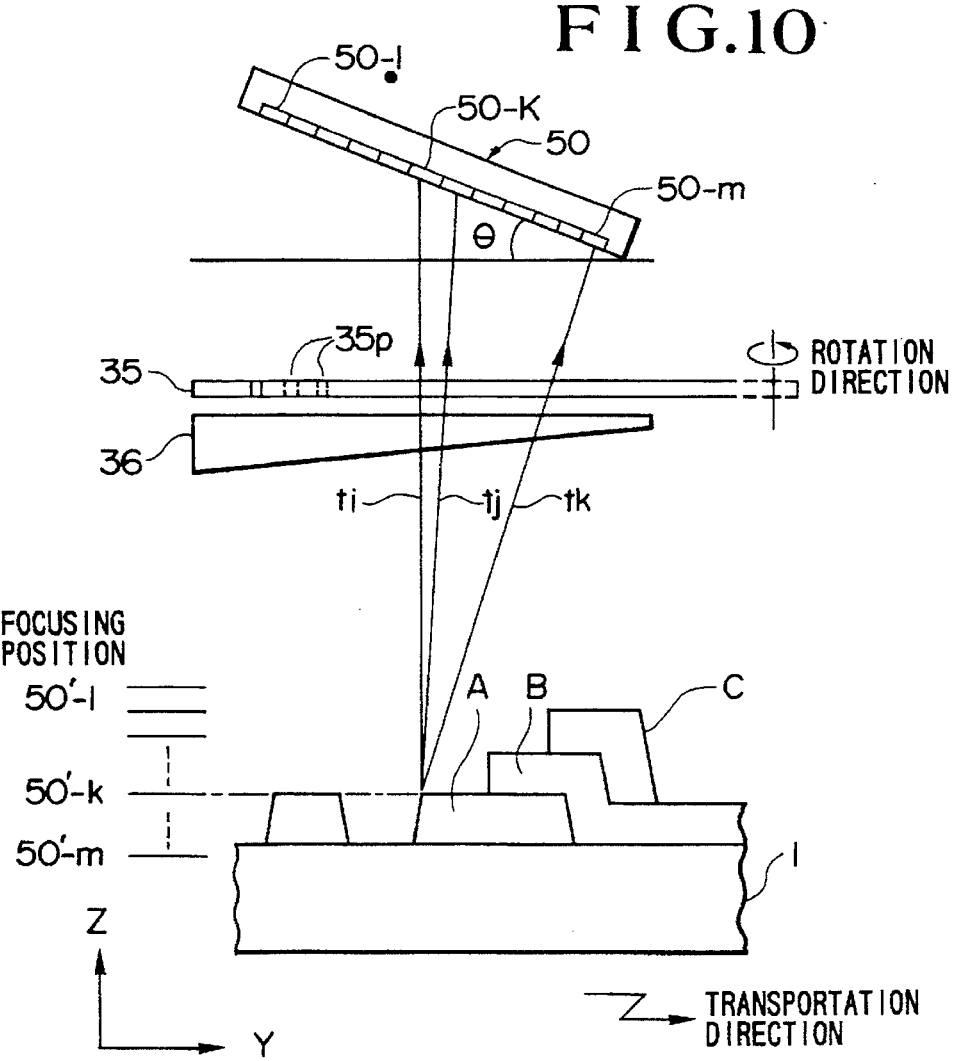
FIG. 10 is an explanatory diagram of pattern images obtained by the TDI image sensor shown in FIG. 8.
Figure 11:
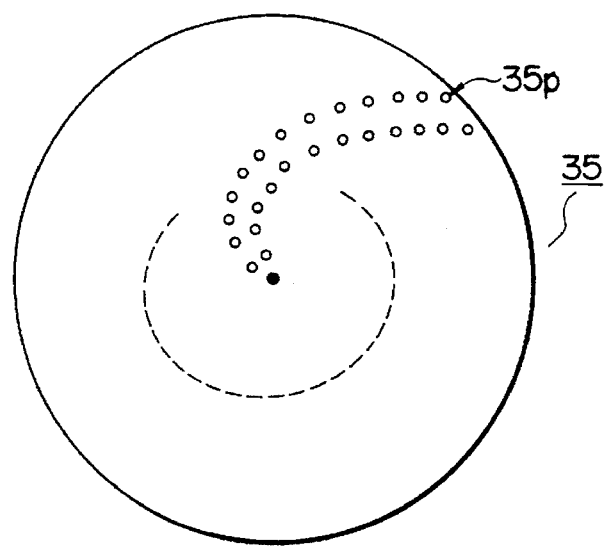
FIG. 11 is a plan view of one example of a rotary disk shown in FIG. 8.
Figure 12A:
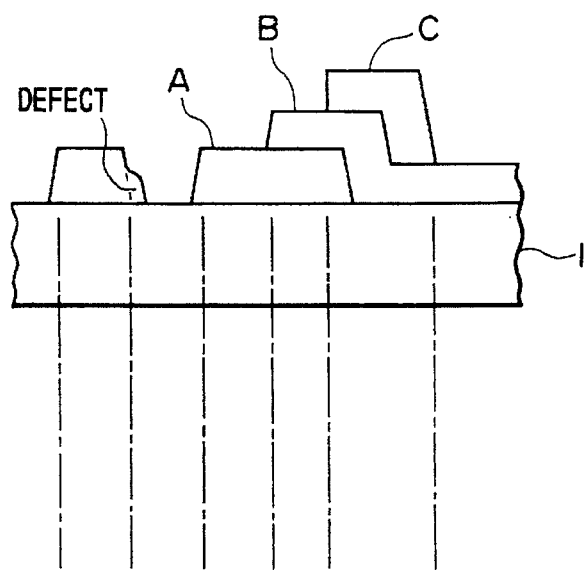
FIGS. 12A to 12C represent patterns and waveforms of signals detected by an image sensor for these patterns.
Figure 12B:
Figure 12C:
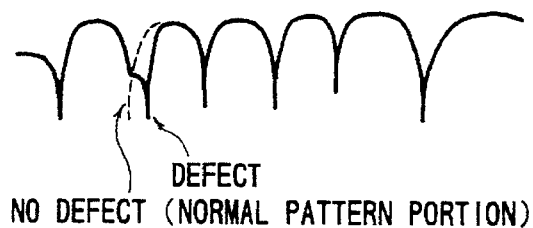

With the above-described arrangement, as shown as a positional relationship of FIG. 10, the respective one-dimensional image sensors 50-1 to 50-m provided within the TDI image sensor 50 are arranged in such a manner that these image sensors are inclined by a predetermined angle "θ" with respect to a plane perpendicular to an optical axis in order that images are focused onto slightly different positions along the direction (Z direction) normal to the optical axis. At this time, both of a rotating disk 35 having pinholes 35p and an optical path length converting element 36 as shown in FIG. 11 are positioned in front of the TDI image sensor, namely between a half mirror 3 and the wafer 1. A large quantity of pinholes 35p, for example, 200,000 pinholes have been made in the rotating disk 35 which is rotated at a high speed by a driver (not shown). A diameter of each pinhole is selected to, e.g., 20 microns. These pinholes have a confocal effect. A rotating disk having such a confocal effect is described in, for instance, "A REAL-TIME CONFOCAL SCANNING OPTICAL MICROSCOPE" written by G.O. Xiao et. al., in SPIE vol. 809, Scanning Imaging Technology, 1987, pages 107 to 113. That is, illumination light originated from a light source 33 and reflected by a half mirror 3 and then passed through the pinholes, is focused on a pattern, and light reflected from the pattern is focused onto the pinholes. Since the rotating disk 35 having the pinholes is rotated at the high speed, the pattern is focused onto all positions on the TDI image sensor. The optical path length converting element 36 gives different optical path lengths to the respective one-dimensional image sensors employed within the TDI image sensor 50, and focuses each image of focusing positions 50'-1, - - - , 50'-k, - - -, 50'-m on the wafer 1 onto the respective image sensor elements 50-1 to 50-m. The one-dimensional image sensor 50-k is focused on an upper surface of an A layer at a time instant "ti" by the rotating disk 35 and the optical path length converting element 36. When the LSI wafer 1 is moved along, for instance, the Y direction, the adjoining one-dimensional image is focused at a time instant "tj" onto a position which is shifted from the upper plane of the above. A layer along the Z direction, namely an off-focused position. In the case, an amount of detected light is not focused on the pinhole due to the confocal effect, and is interrupted, thereby being a small value. As described above, the same position (position along the Y direction) of the wafer 1 to be checked is detected by the respective one-dimensional image sensors under slightly shifted positions along the Z direction, and off-focused patterns do not contribute the detection signals of the one-dimensional image sensors. If there are high stepped differences and concaves/convexes in a wafer to be checked, since this checking wafer is focused onto any of these one-dimensional image sensor's planes, signals having large and bright amplitudes can be outputted, so that a fact whether or not a defect is present is surely reflected on any of the output values from the one-dimensional image sensors. Due to the adding function of the TDI image sensor, all of these signals are added to each other. As shown in FIG. 12A, in case of a three-layer pattern to be checked, if there is a pattern defect at the undermost layer, all of three layers represent equivalent contrast in accordance with this preferred embodiment, although as shown in FIG. 12B, only the pattern of the middle layer has large contrast of the detected signal waveform in the conventional apparatus, since only the middle layer is focused. As a consequence, although as represented in FIG. 12B, the contrast is small and no clear difference is made between the under layer having the defect and the normal pattern portion in prior art, a clear discrimination between the under layer having the defect and the normal pattern portion can be established as shown in FIG. 12C in accordance with this preferred embodiment.

It should be noted that the light reflected from the wafer 1 may be directly focused onto the image sensor 50 without employing the rotating disk 35 and the optical path length converting element 36. In this case, the one-dimensional image sensor 50k is focused on the upper surface of the A layer at the time instant "ti". When the LSI wafer 1 is moved along the Y direction, the one-dimensional image sensor adjoining the first-mentioned one-dimensional image sensor is focused onto the same position of the upper plane of the above-described A layer at the time instant "tj". As described above, the same position (position along the Y direction) of the object may be detected by the respective one-dimensional image sensor without any positional shifts. As a result, even when there are high differences and concaves/convexes in an object, the object is focused onto any planes of these one-dimensional image sensors. Accordingly, the signals having bright and large amplitudes can be outputted, and then such a fact whether or not a defect is present is reflected in a value of any of the one-dimensional image sensors.

In FIG. 8, the above-described TDI image sensor 50 outputs a plurality of image signals 51-1 to 51-n for, e.g., 8 channels in a parallel form. These output signals in 8 channels are delayed in the delay memory 37 by a time period during which the wafer 1 is moved by 1 chip along the Y direction. As a result, both of the output signals of the TDI image sensor 50 and the output signals of the delay memory 37 which are outputted at the same time, correspond to the image signals of the adjoining chips 2a and 2b. The output signals for the 8 channels are compared with the delayed output signals thereof in a parallel form every channel, and a defect is detected at a high speed. Next, a content of process operations for 1 channel will now be explained.

Since defect judging units 101 to 108 provided for the respective channels have the same arrangements as the unit constructed of the blocks 8a, 8b, 9a, 9b, 10, 11a, 11b, 12 to 15 shown in FIG. 1 and the same functions thereto, the explanation thereof is omitted. As a consequence, a defect appearing in an image of the corresponding channel can be detected every channel in this preferred embodiment.

Figure 13:
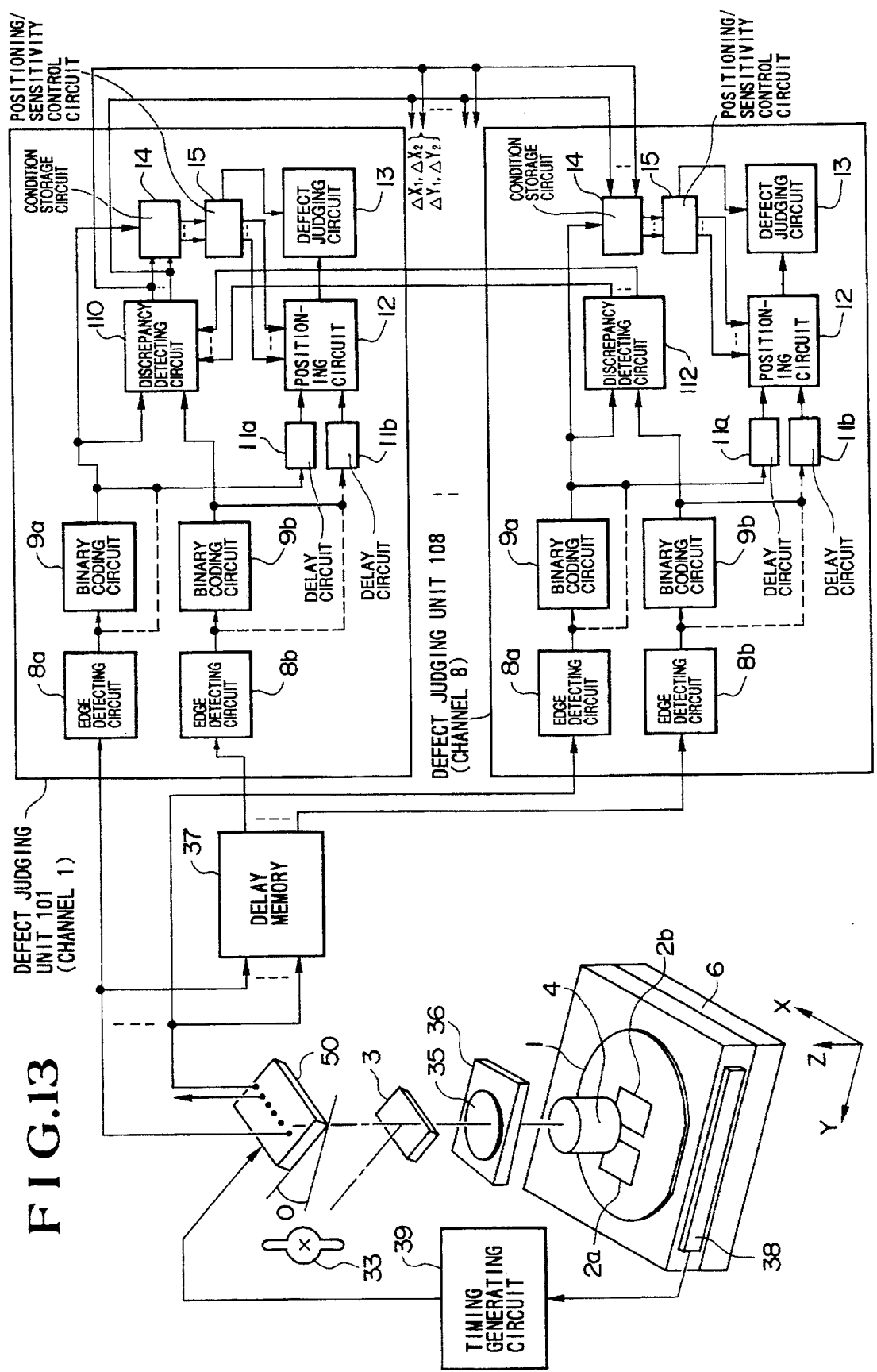
FIG. 13 is a schematic block diagram for showing a pattern checking method and an apparatus thereof according to a modified embodiment of the embodiment shown in FIG. 8.
Figure 14:
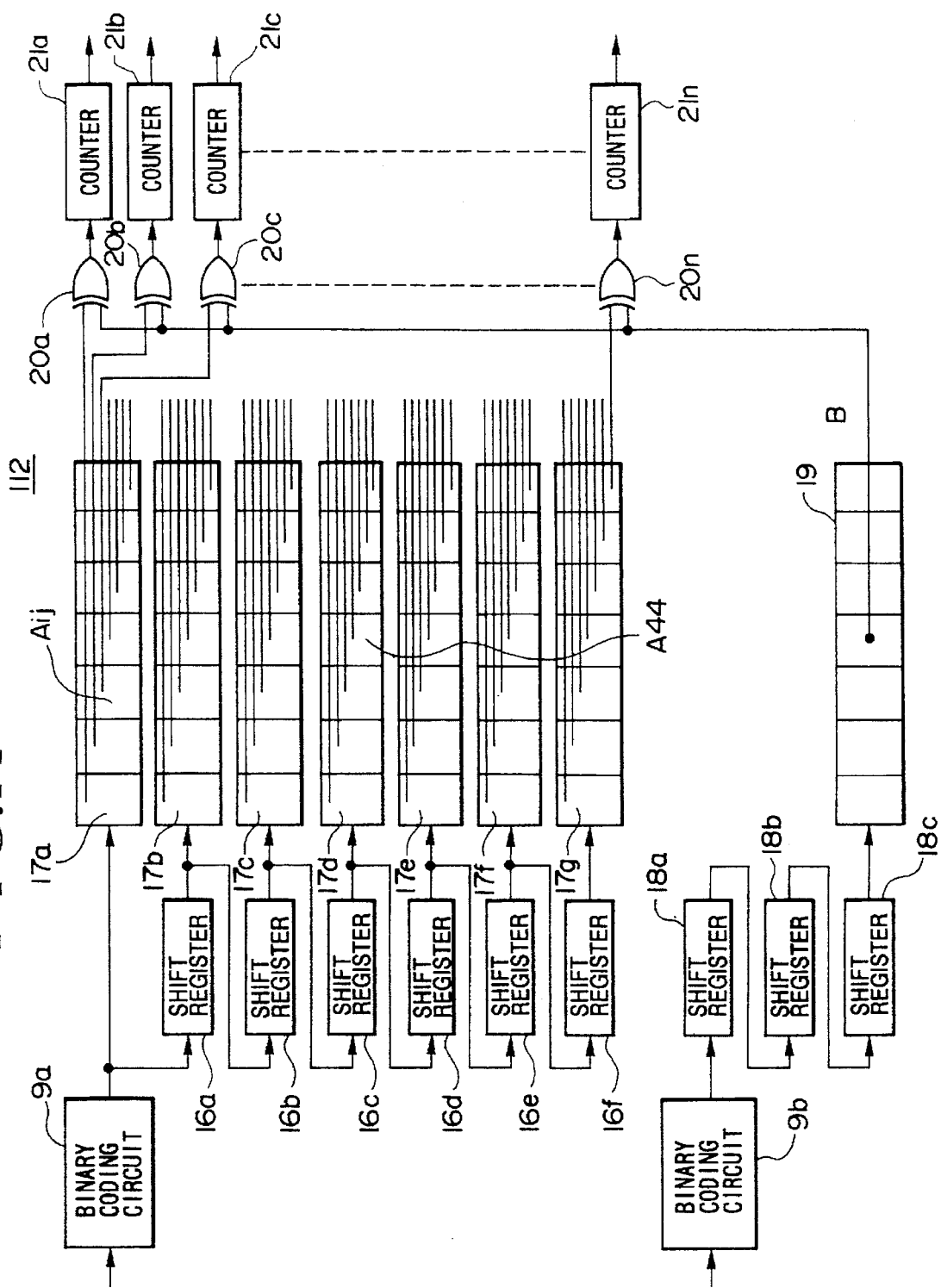
FIG. 14 is a schematic block diagram for representing one example of a discrepancy detecting circuit for preselected channels in FIG. 13.
Figure 15:
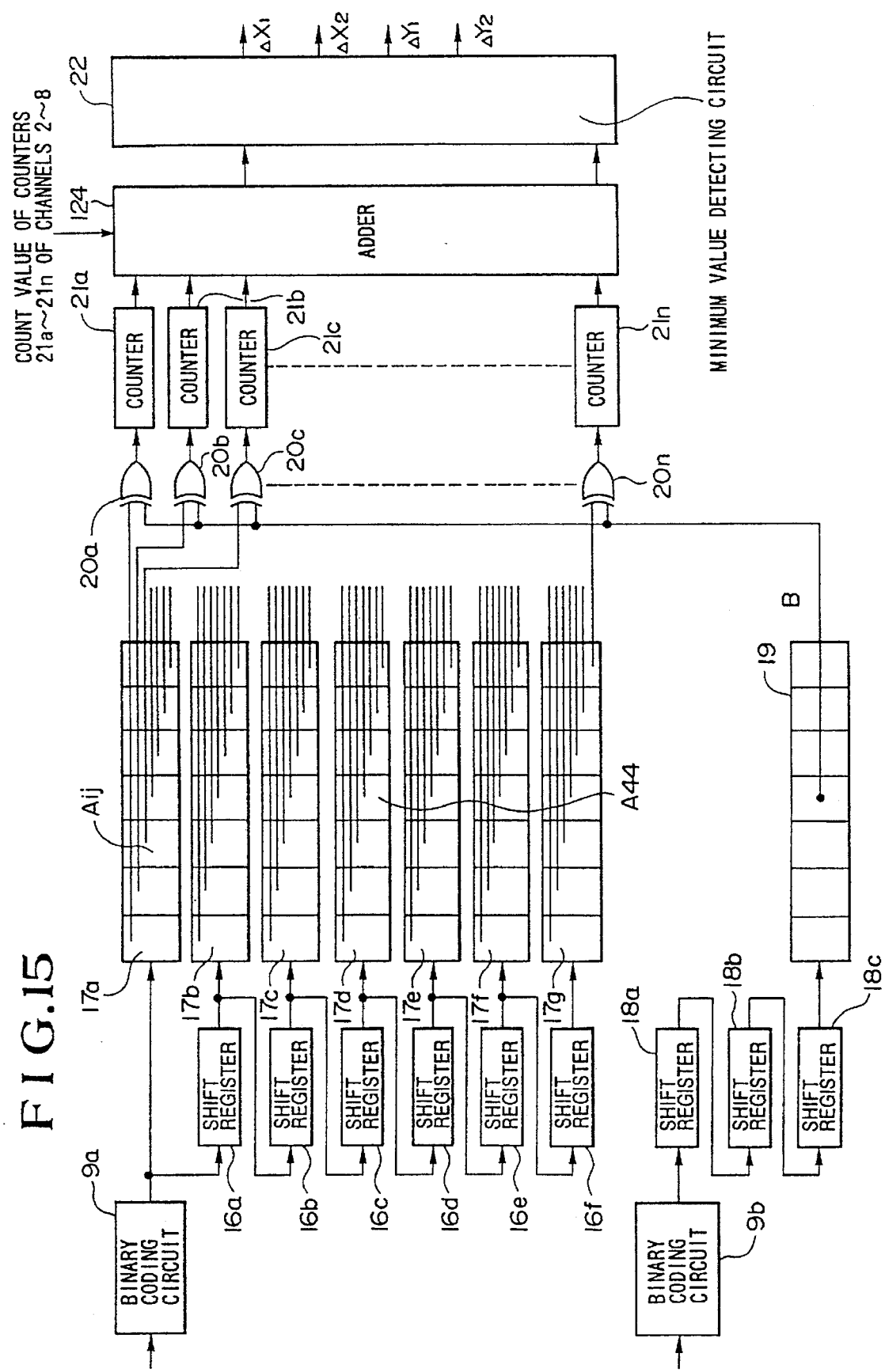
FIG. 15 is a schematic block diagram for showing one example of a discrepancy detecting circuit for a certain channel indicated in FIG. 13.

Although the defect detecting process operations are completely and independently performed every channel in this preferred embodiment, a portion of these circuits may be commonly utilized in the respective channels. In FIG. 13, there is shown an example of such a pattern checking apparatus that the positioning operations are commonly utilized. In the pattern checking apparatus indicated in FIG. 13, a discrepancy detecting circuit 112 (corresponding to the discrepancy detecting circuit 10 shown in FIG. 10) in, for instance, the channels 2 to 8 is so constructed as shown in FIG. 14. That is, count values of the respective counters 21a to 21n in the respective channels 2 to 8 are supplied to an adder 124 of a discrepancy detecting circuit 110 employed in the channel 1. In the adder 124, these count values of the counters 21a to 21n in these channels 1 to 8 are added to each other every counters 21a to 21n, and thereafter the added values are supplied to a minimum value detecting circuit 22 so as to be processed. The minimum value detecting circuit of the channel 1 calculated shift amounts $\Delta X_1$, $\Delta X_2$, $\Delta Y_1$ and $\Delta Y_2$ based upon these added values, which will then be furnished to the condition storage circuit 14 of the respective channels 1 to 8. With the above-described operations, since the images over the broader range can be handled, precision of the positional shift correction can be improved. This is very useful to investigate such a place whose pattern density is low.

It should be noted that the channels 1, 2, 7 and 8 may be constructed with the above-described arrangements, and the remaining channels may employ only the delay circuit 23, positioning circuit 24, and defect judging circuit 25, by which no discrepancy detection is carried out.

Although the defect detection has been performed with utilizing the binary-coded image and the binary coding circuit 12 in the above-described preferred embodiment, another defect detection may be carried out with employment of a variable density image per se, but without employment of the binary-coding circuit 12 in FIGS. 8 and 13, namely in a circuit indicated by dot lines of FIGS. 8 and 13. In this case, the output from the binary-coding circuit 9a is connected only to the discrepancy detecting circuit 10 and the condition storage circuit 14. Under this circumstance, a region where there is a great difference in density is to be recognized as a defect. With the above-described arrangement, the signal of the defect different from the normal pattern portion can be detected in higher precision. Practically, although a slight magnification error (position in the X direction) is caused by the image focusing operation along the direction perpendicular to the moving direction of the respective one-dimensional image sensors, this error is canceled by the comparison so that no problem is made. As described above, a TDI image sensor owns its object to increase an amount of detection light. Moreover, it is very effective for this TDI image sensor to increase a depth of focus. As a result of such a particular merit, even if a multi-layer pattern made of concaves and convexes with overlapped layers is checked, the high-precision pattern detection where each of the layers is focused can be compared with the high sensitivity. In particular, even if very fine defects are present in every layer, these defects can be detected at high precision. As a consequence, the defect detecting performance of the pattern checking apparatus according to this preferred embodiment can be extremely improved, as compared with the conventional pattern checking apparatus.

While the present invention has been described in detail with reference to the various preferred embodiments, the respective constructive elements can be realized by the conventional techniques. Although it has been described such a method for checking a pattern with employment of a single TDI image sensor, the present invention may be applied to such a method for comparing two images with each other which have been simultaneously detected by using two TDI image sensors.

Also, in accordance with the method previously proposed by the Applicant, namely as described in JP-A-61-65444, the reference pattern is formed from the images detected from the reference chip; and this reference pattern is compared with a circuit pattern of a checking chip, whereby a defect may be detected. In case of such a comparing method with employment of design data, only care is taken to the relationship among these layers along the vertical direction without paying a specific care to a difference in blurring phenomena caused by the positional relationships in the respective layers along the Z direction, and also a correct pattern comparison may be achieved with a simple and uniform process, assuming now that they are present on the same plane.

We claim:

1. A pattern checking method, wherein one pattern and a reference pattern are scanned by an image sensor functioning as a pattern detector so that two-dimensional images of said one and reference patterns are continuously obtained by moving the patterns relative to the sensor, wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of the positioned images are compared with each other, whereby a discrepancy between these positioned images is judged as a defect, comprising the step of:

(a) comparing pixels of an image of one area of said one pattern with pixels of an image of one area of said reference pattern which corresponds to said one area of said one pattern to obtain a result of comparison;

(b) storing said result of comparison into a memory, said result of comparison including positional shift amount information;

(c) comparing pixels of an image of another area of said one pattern with pixels of an image of another area of said reference pattern which corresponds to said another area of said one pattern to obtain a positional shift amount between images of corresponding portions of said another area of said one and reference patterns;

(d) correcting said positional shift amount based on said result of comparison stored in said memory;

(e) positioning both of said images of said another area of said one and reference patterns based on said corrected positional shift amount; and (f) comparing said positioned images of said another area of said one and reference patterns with each other to determine a discrepancy between said compared positioned images as a defect.

2. A pattern checking method as claimed in claim 1, wherein said reference pattern image is an image which has been formed with having the same pattern as said one pattern, and is obtained by detecting said reference pattern.

3. A pattern checking method, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of a first pattern with an pixels of image of one area of a second pattern which corresponds to said one area of said first pattern to obtain a result of comparison;

(b) storing said result of comparison into a memory, said result of comparison including positional shift amount information;

(c) comparing pixels of an image of another area of said first pattern with pixels of an image of another area of said second pattern which corresponds to said another area of said first pattern to obtain a positional shift amount between images of corresponding portions of said another area of said first and second patterns;

(d) correcting said positional shift amount based on said result of comparison stored in said memory;

(e) positioning both of said images of said another areas of said first and second patterns based on said corrected positional shift amount; and (f) comparing said positioned images of said another area of said first and second patterns with each other to determine a discrepancy between said compared positioned images as a defect.

4. A pattern checking method as claimed in claim 3, wherein said step (d) includes a step of correcting the positional shift of one of said images based on a positional shift amount which has been previously detected as to said two patterns, and a positional shift amount which is presently detected as to said two patterns; thereby obtaining a plurality of images corrected at different positions; and said step (e) includes a step of positioning both of said plural obtained images and the other of said images.

5. A pattern checking method as claimed in claim 3, wherein when said presently detected positional shift amount is higher than a predetermined value with respect to said previously detected positional shift amount, positioning operations for the images are carried out at a large quantity of different image positions as to said two patterns.

6. A pattern checking method, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of a first pattern with pixels of an image of one area of a second pattern which corresponds to said one area of said first pattern to obtain a result of comparison;

(b) storing said result of comparison into a memory, said result of comparison including positional shift amount information;

(c) comparing pixels of an image of another area of said first pattern with pixels of an image of another area of said second pattern which corresponds to said another area of said first pattern to obtain a positional shift amount between images of corresponding portions of said another area of said first and second patterns;

(d) correcting said positional shift amount based on said result of comparison stored in said memory;

(e) positioning both of said images of said another areas of said first and second patterns based on said corrected positional shift amount; and (f) comparing said positioned images of said another area of said first and second patterns with each other to determine a discrepancy between said compared positioned images as a defect;

wherein when one of a presently detected positional shift amount is greater than a predetermined value with respect to a predetermined positional shift amount, and a pattern density of the corresponding positions of images is smaller than a predetermined value, positioning operations for the images are carried out at a large quantity of different positions of said two patterns.

7. A pattern checking method, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of a first pattern with pixels of an image of one area of a second pattern which corresponds to said one area of said first pattern to obtain a result of comparison;

(b) storing said result of comparison into a memory, said result of comparison including positional shift amount information;

(c) comparing pixels of an image of another area of said first pattern with pixels of an image of another area of said second pattern which corresponds to said another area of said first pattern to obtain a positional shift amount between images of corresponding portions of said another area of said first and second patterns;

(d) correcting said positional shift amount based on said result of comparison stored in said memory;

(e) positioning both of said images of said another areas of said first and second patterns based on said corrected positional shift amount; and (f) comparing said positioned images of said another area of said first and second patterns with each other to determine a discrepancy between said compared positioned images as a defect;

wherein when one of a presently detected positional shift amount is greater than a predetermined value with respect to a previously detected positional shift amount as to said two patterns and a pattern density of the corresponding positions of these images is smaller than a predetermined value, a sensitivity for judging a defect is varied.

8. A pattern checking method, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of a first pattern with pixels of an image of one area of a second pattern which corresponds to said one area of said first pattern to obtain a result of comparison;

(b) storing said result of comparison into a memory, said result of comparison including positional shift amount information;

(c) comparing pixels of an image of another area of said first pattern with pixels of an image of another area of said second pattern which corresponds to said another area of said first pattern to obtain a positional shift amount between images of corresponding portions of said another area of said first and second patterns;

(d) correcting said shift amount based on said result of comparison stored in said memory;

(e) positioning both of said images of said another areas of said first and second patterns based on said corrected positional shift amount; and (f) comparing said positioned images of said another area of said first and second patterns with each other to determine a discrepancy between said compared positioned images as a defect;

wherein when a presently detected positional shift amount is greater than a predetermined value with respect to a predetermined positional shift amount, a sensitivity for judging a defect is varied.

9. A pattern checking method, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of a first pattern with pixels of an image of one area of a second pattern which corresponds to said one area of said first pattern to obtain a result of comparison;

(b) storing said result of comparison into a memory, said result of comparison including positional shift amount information;

(c) comparing pixels of an image of another area of said first pattern with pixels of an image of another area of said second pattern which corresponds to said another area of said first pattern to obtain a positional shift amount between images of corresponding portions of said another area of said first and second patterns;

(d) correcting said positional shift amount based on said result of comparison stored in said memory;

(e) positioning both of said images of said another areas of said first and second patterns based on said corrected positional shift amount; and (f) comparing said positioned images of said another area of said first and second patterns with each other to determine a discrepancy between said compared positioned images as a defect;

wherein said step (c) includes a step in which the number of pixels having discrepancies between the images of said two detected patterns at the corresponding positions at predetermined time periods is detected as said shift amount; and wherein when a presently detected number of pixels having discrepancies is greater than a predetermined value with respect to a previously detected number of pixels having discrepancies as to said two patterns, said step (e) is carried out at a large quantity of different positions for the images as to said two patterns.

10. A pattern checking method, wherein two patterns are scanned by an image sensor functioning as a pattern detector so that two-dimensional images of said two patterns are continuously obtained by moving said two patterns relative to said detector, and wherein a detection is performed in images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of a first pattern with pixels of an image of one area of a second pattern which corresponds to said one area of said first pattern to obtain a result of comparison;

(b) storing said result of comparison into a memory, said result of comparison including positional shift amount information;

(c) comparing pixels of an image of another area of said first pattern with pixels of an image of another area of said second pattern which corresponds to said another area of said first pattern to obtain a positional shift amount between images of corresponding portions of said another area of said first and second patterns;

(d) correcting said positional shift amount based on said result of comparison stored in said memory;

(e) positioning both of said images of said another areas of said first and second patterns based on said corrected positional shift amount; and (f) comparing said positioned images of said another area of said first and second patterns with each other to determine a discrepancy between said compared positioned images as a defect;

wherein said step (c) includes a step in which the number of pixels having discrepancies between the images of said two detected patterns at corresponding positions at predetermined time periods is detected as said shift amount; and wherein when a presently detected number of pixels having discrepancies is greater than a predetermined value with respect to a previously detected number of pixels having discrepancies as to said two images, a sensitivity for judging a defect is varied.

11. A pattern checking apparatus, wherein one pattern and a reference pattern are scanned by an image sensor functioning as a pattern detector so that two-dimensional images of said one and reference patterns are continuously obtained by moving said two patterns relative to said detector, wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising:

means for comparing pixels of an image of one area of said one pattern with pixels of an image of one area of said reference pattern which corresponds to said one area of said one pattern to obtain a result of comparison;

a memory for storing said result of comparison, said result of comparison including positional shift amount information;

means for comparing pixels of an image of another area of said one pattern with pixels of an image of another are of said reference pattern which corresponds to said another area of said one pattern to obtain a positional shift amount between the images of corresponding portions of said another areas of said one and reference patterns;

means for correcting said positional shift amount based on said result of comparison stored in said memory;

means for positioning both of said images of said another areas of said one and reference patterns based on said corrected positional shift amount; and means for comparing said positioned images of said another areas of said one and reference patterns with each other to determine a discrepancy between said compared positioned images as a defect.

12. A pattern checking apparatus as claimed in claim 11, wherein said shift amount detecting means includes means for detecting as said shift amount the number of discrepant pixels between the images of said two detected patterns at the corresponding positions every predetermined time period and when a presently detected discrepant pixel number is greater than a predetermined value with respect to a previously detected discrepant pixel number, the positioning operations for the images are carried out at a large quantity of different positions for the images.

13. A pattern checking method, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein said pixels of positioned images are compared with each other, whereby a discrepancy between these compared images is judged as a defect, comprising:

means for comparing pixels of an image of one area of first pattern with pixels of an image of one area of a second pattern which corresponds to said one area of said first pattern to obtain a result of comparison;

a memory for storing said result of comparison, said result of comparison including positional shift amount information;

means for comparing pixels of an image of another area of said first pattern with pixels of an image of another area of said second pattern which corresponds to said another area of said first pattern to obtain a positional shift amount between the images of corresponding portions of said another areas of said first and second patterns;

means for correcting said positional shift amount based on said result of comparison stored in said memory;

means for positioning both of said images of said another areas of said first and second patterns based on said corrected positional shift amount;

means for comparing said positioned images of said another areas of said first and second patterns with each other to determine a discrepancy between said compared positioned images as a defect; and means for obtaining a pattern density of said image, as a comparison result, and when one of a presently detected shift amount is greater than a predetermined value with respect to a predetermined positional shift amount and the pattern density of these images is smaller than a predetermined value, causing said means for positioning to position the images at a large number of different positions for the two patterns.

14. A pattern checking apparatus, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein said pixels of positioned images are compared with each other, whereby a discrepancy between these compared images is judged as a defect, comprising:

means for comparing pixels of an image of one area of first pattern with pixels of an image of one area of a second pattern which corresponds to said one area of said first pattern to obtain a result of comparison;

a memory for storing said result of comparison, said result of comparison including positional shift amount information;

means for comparing pixels of an image of another area of said first pattern with pixels of an image of another area of said second pattern which corresponds to said another area of said first pattern to obtain a positional shift amount between the images of corresponding portions of said another areas of said first and second patterns;

means for correcting said positional shift amount based on said result of comparison stored in said memory;

means for positioning both of said images of said another areas of said first and second patterns based on said corrected positional shift amount;

means for comparing said positioned images of said another areas of said first and second patterns with each other to determine a discrepancy between said compared positioned images as a defect; and means for obtaining a pattern density of said image, as a comparison result, and when one of a presently detected shift amount is greater than a predetermined value with respect to a previously detected positional shift amount and the pattern density of these images is smaller than a predetermined value, varying a sensitivity for judging a defect.

15. A pattern checking apparatus, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising:

means for comparing pixels of an image of one area of first pattern with pixels of an image of one area of a second pattern which corresponds to said one area of said first pattern to obtain a result of comparison;

a memory for storing said result of comparison, said result of comparison including positional shift amount information;

means for comparing pixels of an image of another area of said first pattern with pixels of an image of another area of said second pattern which corresponds to said another area of said first pattern to obtain a positional shift amount between the images of corresponding portions of said another areas of said first and second patterns;

means for correcting said positional shift amount based on said result of comparison stored in said memory;

means for positioning both of said images of said another areas of said first and second patterns based on said corrected positional shift amount; and means for comparing said positioned images of said another areas of said first and second patterns with each other to determine a discrepancy between said compared positioned images as a defect;

wherein said means for comparing, when a presently detected positional shift amount is greater than a predetermined positional shift amount, varies a sensitivity for judging a defect.

16. A pattern checking apparatus, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein said pixels of positioned images are compared with each other, whereby a discrepancy between these compared images is judged as a defect, comprising:

means for comparing pixels of an image of one area of first pattern with pixels of an image of one area of a second pattern which corresponds to said one area of said first pattern to obtain a result of comparison;

a memory for storing said result of comparison, said result of comparison including positional shift amount information;

means for comparing pixels of an image of another area of said first pattern with pixels of an image of another area of said second pattern which corresponds to said another area of said first pattern to obtain a positional shift amount between the images of corresponding portions of said another areas of said first and second patterns;

means for correcting said positional shift amount based on said result of comparison stored in said memory;

means for positioning both of said images of said another areas of said first and second patterns based on said corrected positional shift amount; and means for comparing said positioned images of said another areas of said first and second patterns with each other to determine a discrepancy between said compared positioned images as a defect;

wherein said means for comparing compares a presently detected number of pixels having discrepancies, or a function thereof with a previously detected number of pixels having discrepancies, or a function thereof, as a comparison result, and, when said presently detected discrepant pixel number, or said function thereof is greater than a predetermined value with respect to said previously detected discrepant pixel number, or a function thereof, varies a sensitivity for judging a defect.

17. A pattern checking method, wherein one pattern and a reference pattern are scanned by an image sensor functioning as a pattern detector so that two-dimensional images of said one and reference patterns are continuously obtained by moving the patterns relative to the sensor, wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of said one pattern with pixels of an image of one area of said reference pattern which corresponds to said one area of said one pattern to obtain a result of comparison;

(b) storing said result of comparison into a memory, said result of comparison including positional shift amount information;

(c) comparing pixels of an image of another area of said one pattern with pixels of an image of another area of said reference pattern which corresponds to said another area of said one pattern to obtain a positional shift amount between images of corresponding portions of said another area of said one and reference patterns;

(d) correcting said positional shift amount based on said result of comparison stored in said memory;

(e) positioning both of said images of said another area of said one and reference patterns based on said corrected positional shift amount; and (f) comparing said positional images of said another area of said one and reference patterns with each other to determine a discrepancy between said compared positioned images as a defect;

wherein said step (c) compares output signals from said image sensor in parallel to increase processing speed.

18. A pattern checking method as claimed in claim 17, wherein as said images sensor means, such as image sensor means is employed that it has such a construction that a plurality of one-dimensional image sensors functioning as a pattern detector are arranged in a two-dimensional form, and an output of a certain one-dimensional image sensor for imaging a certain position of one pattern is delayed for a predetermined time period, and also both of an output of an one-dimensional image sensor adjoining said first-mentioned one-dimensional image sensor, which images the same position of the same pattern, and said delayed output of the certain one-dimensional image sensor are sequentially added to derive a summation output.

19. A pattern checking method as claimed in claim 18, wherein said image sensor means is inclined at a predetermined angle with respect to a plane perpendicular to the reflection light from said patterns.

20. A pattern checking method as claimed in claim 19, wherein the inclination direction of said image sensor means corresponds to a direction perpendicular to a longitudinal direction of said plurality of one-dimensional image sensors employed within said image sensor means.

21. A pattern checking method as claimed in claim 19, wherein the inclination angle of said image sensor means is an angle corresponding to a difference in a concave and a convex of said patterns.

22. A pattern checking method as claimed in claim 19, wherein a relative position between said patterns and said image sensor means is moved, and the corresponding one-dimensional image sensor means is driven in accordance with said relative position after movement.

23. A pattern checking apparatus, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising:

means for comparing pixels of an image of one area of first pattern with pixels of an image of one area of a second pattern which corresponds to said one area of said first pattern to obtain a result of comparison;

a memory for storing said result of comparison, said result of comparison including positional shift amount information;

means for comparing pixels of an image of another area of said first pattern with pixels of an image of another area of said second pattern which corresponds to said another area of said first pattern to obtain a positional shift amount between the images of corresponding portions of said another areas of said first and second patterns;

means for correcting said positional shift amount based on said result of comparison stored in said memory;

means for positioning both of said images of said another areas of said first and second patterns based on said corrected positional shift amount; and means for comparing said positioned images of said another areas of said first and second patterns with each other to determine a discrepancy between said compared positioned images as a defect;

wherein said means for respectively, comparing output signals from said image sensor compares said output signals in parallel to increase processing speed.

24. A pattern checking apparatus as claimed in claim 23, wherein said image sensor means is such an image sensor means having a construction that a plurality of one-dimensional image sensors functioning as a pattern detector are arranged in a two-dimensional form, and an output of a certain one-dimensional image sensor for imaging a certain position of one pattern is delayed for a predetermined time period, and also both of an output of an one-dimensional image sensor adjoining said first mentioned one-dimensional image sensor, which images the same position of the same pattern, and said delayed output of the certain one-dimensional image sensor are sequentially added to derive a summation output.

25. A pattern checking apparatus as claimed in claim 24, wherein said image sensor means is inclined at a predetermined angle with respect to a plane perpendicular to the reflection light from said patterns.

26. A pattern checking apparatus as claimed in claim 25, wherein the inclination direction of said image sensor means corresponds to a direction perpendicular to a longitudinal direction of said plurality of one-dimensional image sensors employed within said image sensor means.

27. A pattern checking apparatus as claimed in claim 25, wherein the inclination angle of said image sensor means is an angle corresponding to a difference in a concave and a convex of said patterns.

28. A pattern checking apparatus as claimed in claim 25, wherein a relative position between said patterns and said image sensor means is moved, and further comprising means for driving the corresponding one-dimensional image sensor means in accordance with said relative position after said movement.

29. A pattern checking method, wherein two patterns are scanned by an image sensor functioning as a pattern detector so that two-dimensional images of said two patterns are continuously obtained by moving said two patterns relative to said detector, and wherein a detection is performed on images of said two patterns which have been formed with the same patterns, at corresponding positions; wherein each of said patterns is divided into a plurality of areas each including a plurality of pixels, wherein pixels of an image of one of said plurality of areas of said one pattern is detected and said detected image is positioned with respect to pixels of an image of one of said plurality of areas of said reference pattern, and wherein pixels of said positioned images are compared with each other, whereby a discrepancy between these compared images is judged as a defect, comprising the steps of:

(a) comparing pixels of an image of one area of a first pattern with pixels of an image of one area of a second pattern which corresponds to said one area of said first pattern to obtain a result of comparison;

(b) storing said result of comparison into a memory, said result of comparison including positional shift amount information;

(c) comparing pixels of an image of another area of said first pattern with pixels of an image of another area of said second pattern which corresponds to said another area of said first pattern to obtain a positional shift amount between images of corresponding portions of said another area of said first and second patterns;

(d) correcting said positional shift amount based on said result of comparison stored in said memory;

(e) positioning both of said images of said another areas of said first and second patterns based on said corrected positional shift amount; and (f) comparing said positioned images of said another area of said first and second patterns with each other to determine a discrepancy between said compared positioned images as a defect;

wherein said step (a) compares output signals from said image sensor in parallel to increase processing speed; and wherein when one of a presently detected positional shift amount is greater than a predetermined value with respect to a predetermined positional shift amount and a pattern density of these images is smaller than a predetermined value, varying a sensitivity for judging a defect.

30. A pattern checking method as claimed in claim 29, wherein as said image sensor means, such an image sensor means is employed which has such a construction that a plurality of one-dimensional image sensors functioning as a pattern detector are arranged in a two-dimensional form, and an output of a certain one-dimensional image sensor for imaging a certain position of one pattern is delayed for a predetermined time period, and also both of an output of an one-dimensional image sensor adjoining said first-mentioned one-dimensional image sensor, which images the same position of the same pattern, and said delayed output of the certain one-dimensional image sensor are sequentially added to derive a summation output.

31. A pattern detecting method as claimed in claim 29, wherein as said image sensor means, such an image sensor means is employed which has such a construction that a plurality of one-dimensional image sensors functioning as a pattern detector are arranged in a two-dimensional form, and an output of a certain one-dimensional image sensor for imaging a certain position of one pattern is delayed for a predetermined time period, and also both of an output of an one-dimensional image sensor adjoining said first-mentioned one-dimensional image sensor, which images the same position of the same pattern, and said delayed output of the certain one-dimensional image sensor are sequentially added to derive a summation output.

32. A pattern checking method according to claim 1, wherein said step (d) includes a substep of correcting said positional shift amount obtained in said step (c) by using at least one of said result of comparison stored in said memory and pattern information of a density of the image in said another area of said one pattern.

33. A pattern checking method according to claim 32, further comprising:

a step of, when said positional shift amount obtained in said step (c) is different from a positional shift amount between the images of said one areas of said one and reference patterns by a value larger than a predetermined positional shift amount, carrying out said steps c to e for at least one different corresponding position of said another areas of said one and reference patterns.

34. A pattern checking method according to claim 32, further comprising:

a step of, when said positional shift amount obtained in said steep c is different from a positional shift amount between the images of said one areas of said one and reference patterns by a value larger than a predetermined positional shift amount, changing a sensitivity for determining a defect in said step (f).

35. A pattern checking method according to claim 32, further comprising:

a step of, when said pattern information represents that a density of the image in said another area of said one pattern is smaller than a predetermined value, carrying out said steps c to e for at least one different corresponding positions of said another areas of said one and reference patterns.

36. A pattern checking method according to claim 32, further comprising:

a step of, when said pattern information represents that a density of the image in said another area of said one pattern is smaller than a predetermined value, changing a sensitivity for determining a defect in said step (f).

37. A pattern checking method according to claim 32, further comprising:

a step of storing said positional shift amount obtained in said step (c) in said memory, wherein an image of still another area of said one pattern and an image of still another area of said reference pattern which corresponds to said still another area of said one pattern are used to determine a defect of said one pattern.

38. A pattern checking apparatus according to claim 11, wherein said means for correcting includes means for correcting said positional shift amount by using at least one of said result of comparison stored in said memory and pattern information of a density of the image in said another area of said one pattern.

39. A pattern checking apparatus according to claim 38, further comprising:

means for, when said positional shift amount is different from a positional shift amount between the images of said one areas of said one and reference patterns by a value larger than a predetermined positional shift amount, carrying out comparing and positioning operations for at least one different corresponding position of said another areas of said one and reference patterns.

40. A pattern checking apparatus according to claim 38, further comprising:

means for, when said positional shift amount is different from a positional shift amount between the images of said one areas of said one and reference patterns by a value larger than a predetermined positional shift amount, changing a sensitivity for determining a defect.

41. A pattern checking apparatus according to claim 38, further comprising:

means for, when said pattern information represents that a density of the image in said another area of said one pattern is smaller than a predetermined value, carrying out comparing and positioning operations for at least one different corresponding positions of said another areas of said one and reference patterns.

42. A pattern checking apparatus according to claim 38, further comprising:

means for, when said pattern information represents that a density of the image in said another area of said one pattern is smaller than a predetermined value, changing a sensitivity for determining a defect.

43. A pattern checking apparatus according to claim 38, further comprising:

means for storing said positional shift amount in said memory, wherein an image of still another area of said one pattern and an image of still another area of said reference pattern which corresponds to said still another area of said one pattern are used to determine a defect of said one pattern.

* * * * *